US011616394B2

(12) United States Patent
Zhou et al.

(10) Patent No.: US 11,616,394 B2
(45) Date of Patent: *Mar. 28, 2023

(54) ELECTRONIC DEVICE

(71) Applicant: DELTA ELECTRONICS, INC., Taoyuan (TW)

(72) Inventors: Min Zhou, Taoyuan (TW); Ke Dai, Taoyuan (TW); Ming-Hui Dai, Taoyuan (TW); Zi-Ying Zhou, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 861 days.

This patent is subject to a terminal disclaimer.

(21) Appl. No.: 15/842,838

(22) Filed: Dec. 14, 2017

(65) Prior Publication Data
US 2018/0109115 A1    Apr. 19, 2018

Related U.S. Application Data

(60) Division of application No. 14/689,037, filed on Apr. 16, 2015, now Pat. No. 9,893,536, which is a
(Continued)

(30) Foreign Application Priority Data

May 15, 2012  (CN) .......................... 201210166393.4
May 15, 2013  (CN) .......................... 201310178627.1
Apr. 30, 2014  (CN) .......................... 201410183525.3

(51) Int. Cl.
*H01F 27/28*        (2006.01)
*H02J 50/10*        (2016.01)
(Continued)

(52) U.S. Cl.
CPC ............ *H02J 50/10* (2016.02); *H01F 27/346* (2013.01); *H01F 27/40* (2013.01); *H01F 38/42* (2013.01);
(Continued)

(58) Field of Classification Search
CPC .............................. H01F 27/346; H01F 27/40
(Continued)

(56) References Cited

U.S. PATENT DOCUMENTS 4,352,080 A * 9/1982 Mitsui .................... H01F 17/04
                                                   336/233
4,635,179 A * 1/1987 Carsten ............. H02M 3/33569
                                                   363/126
(Continued)

FOREIGN PATENT DOCUMENTS

CN             1227660 A      9/1999
CN          101017730 A      8/2007
(Continued)

*Primary Examiner* — Tszfung J Chan
(74) *Attorney, Agent, or Firm* — CKC & Partners Co., LLC

(57) ABSTRACT

An electronic device includes a magnetic element, and a first circuit module. The magnetic element includes a magnetic core set and a winding assembled in the magnetic core set. The first circuit module is coupled to the first winding of the magnetic element. A vertical projection area of the first circuit module has an overlap portion with a vertical projection area of the winding of the magnetic core set on a first plane, and the first plane is a horizontal plane at which the winding is located.

10 Claims, 24 Drawing Sheets

Related U.S. Application Data continuation-in-part of application No. 14/076,880, filed on Nov. 11, 2013, now Pat. No. 9,837,198, which is a continuation-in-part of application No. 13/555,722, filed on Jul. 23, 2012, now Pat. No. 9,484,145.

(51) Int. Cl.
*H01F 27/34* (2006.01)
*H01F 27/40* (2006.01)
*H01F 38/42* (2006.01)
*H02M 3/335* (2006.01)

(52) U.S. Cl.
CPC ..... *H01F 2027/2819* (2013.01); *H02M 3/335* (2013.01)

(58) Field of Classification Search
USPC ....... 336/178, 179, 185, 196, 200, 208, 212, 336/213, 221, 232
See application file for complete search history.

(56) References Cited

U.S. PATENT DOCUMENTS

| | | | |
|---|---|---|---|
| 4,864,486 A * | 9/1989 | Spreen | H01F 27/2804 363/126 |
| 4,965,712 A * | 10/1990 | Duspiva | H01F 30/10 336/175 |
| 5,598,327 A | 1/1997 | Somerville et al. | |
| 6,211,767 B1 | 4/2001 | Jitaru | |
| 6,317,965 B1 * | 11/2001 | Okamoto | H02M 1/12 29/602.1 |
| 6,501,233 B1 | 12/2002 | Odell et al. | |
| 2007/0152795 A1 * | 7/2007 | Zeng | H01F 27/2804 336/212 |
| 2010/0164670 A1 | 7/2010 | Nakahori et al. | |
| 2010/0301981 A1 * | 12/2010 | Zeng | H01F 27/2885 336/105 |
| 2011/0032683 A1 * | 2/2011 | Li | H02M 3/33592 361/760 |
| 2011/0050379 A1 | 3/2011 | Kim | |
| 2011/0205008 A1 | 8/2011 | Brennan | |
| 2012/0243278 A1 | 9/2012 | Zhang et al. | |
| 2014/0104890 A1 * | 4/2014 | Matsubara | H02M 3/3376 363/17 |

FOREIGN PATENT DOCUMENTS

| | | | | |
|---|---|---|---|---|
| CN | 101231907 A | | 7/2008 | |
| CN | 201081806 Y | | 7/2008 | |
| CN | 201084533 Y | | 7/2008 | |
| CN | 201138608 Y | | 10/2008 | |
| CN | 101770853 A | | 7/2010 | |
| CN | 101859638 A | | 10/2010 | |
| CN | 102243918 A | | 11/2011 | |
| CN | 102360787 A | * | 2/2012 | |
| CN | 102360787 A | | 2/2012 | |
| CN | 102763178 A | | 10/2012 | |
| CN | 103427597 A | | 12/2013 | |
| CN | 103731036 A | * | 4/2014 | ........ H02M 3/33584 |
| CN | 103731036 A | | 4/2014 | |
| JP | 09097728 A | * | 4/1997 | |
| JP | 2006108415 A | * | 4/2006 | |
| JP | 2011087367 A | * | 4/2011 | |
| TW | 231358 B | | 10/1994 | |
| TW | 201106145 A | | 2/2011 | |
| TW | 201222582 A | | 6/2012 | |
| WO | 2011152686 A2 | | 12/2011 | |

* cited by examiner

ELECTRONIC DEVICE

RELATED APPLICATIONS

The present application is a Divisional Application of the U.S. application Ser. No. 14/689,037, filed Apr. 16, 2015, which claims priority to Chinese Application Serial Number 201410183525.3, filed Apr. 30, 2014. The U.S. application Ser. No. 14/689,037 is a continuation-in-part application of U.S. application Ser. No. 13/555,722, filed Jul. 23, 2012, which claims priority to China Patent Application Serial Number 201210166393.4, filed May 15, 2012. The U.S. application Ser. No. 14/689,037 is a continuation-in-part application of U.S. application Ser. No. 14/076,880, filed Nov. 11, 2013, which claims priority to Chinese Application Serial Number 201310178627.1, filed May 15, 2013. The U.S. application Ser. No. 14/076,880 is a continuation-in-part application of U.S. application Ser. No. 13/555,722. Aforementioned applications are herein incorporated by reference.

BACKGROUND

Technical Field

The present disclosure relates to an electronic device in power electronic fields. More particularly, the present disclosure relates to an electronic device including a magnetic element.

Description of Related Art

With respect to a conventional transformer, a planar transformer uses the material such as a single-layer or multi-layer printed wiring board (PWB) or copper foil to replace copper wires in the conventional transformer. Wires in the planar transformer are actually a planar conductor, wherein currents flow to its edges away from its center, but the currents still all flow through the planar conductor, and thus quite a high current density can be obtained. Further, because a magnetic core used in the planar transformer has a small size, such that a large surface area, a flat profile, better heat dissipation could be achieved, and a better efficiency can be obtained. Furthermore, the planar transformer advantageously has a compact structure, better coupling and good insulation, etc., such that the planar transformer is suitable for product miniaturization, and has been applied to various products, such as a power converter.

Referring to FIG. 1, FIG. 1 is a schematic block diagram showing the circuit principle according to a power converter including a planar transformer.

As shown in FIG. 1, a power converter 1 includes a planar transformer 11, a secondary-side circuit module 12 and a primary-side circuit module 13. The secondary-side circuit module 12 is coupled to a secondary side of the planar transformer 11, and the primary-side circuit module 13 is coupled to a primary side of the planar transformer 11.

Further, referring to FIG. 2, FIG. 2 is a schematic structural diagram showing a power converter having a conventional planar transformer.

The planar transformer 11 includes a magnetic core and a winding (not shown), wherein the secondary-side circuit module 12 is connected to the winding through a secondary-side outlet connector, and the primary-side circuit module 13 is connected to the winding through a primary-side outlet connector.

However, a current loop formed from a winding outlet connector of the conventional planar transformer 11 and an external circuit module of the conventional planar transformer 11 may store relatively large magnetic energy, and thus larger leakage inductance may be formed. For example, a loop formed from the secondary-side outlet connector of the winding and the secondary-side circuit module 12 may form larger leakage inductance. The leakage inductance is an important index for the planar transformer. For example, if the leakage inductance exists in a switching mode power supply, a counter electromotive force will be caused by the leakage inductance when a switch device is turned off instantaneously, wherein the counter electromotive force is likely to cause an over voltage breakdown of the switch device. Further, the leakage inductance may form an oscillation circuit with parasitic capacitors in the planar transformer windings; further generating oscillation and electromagnetic energy radiating outward, resulting in electromagnetic interference (EMI). Furthermore, as to some transformers, such as a flyback transformer, the leakage inductance will cause loss, thus lowering the efficiency of the flyback transformer.

In view of this, it is a technical problem to be solved by technical people in the industry regarding how to design a converter to reduce magnetic energy stored in a loop formed from an outlet connector of a planar transformer and an external circuit for reducing leakage inductance by changing the structure of the planar transformer.

SUMMARY

One aspect of the present disclosure provides an electronic device. The electronic device includes a magnetic element and a first circuit module. The magnetic element includes a magnetic core set and a winding assembled in the magnetic core set. The first circuit module is coupled to a winding of the magnetic element. A vertical projection area of the first circuit module has an overlap portion with a vertical projection area of the winding of the magnetic core set on a first plane, and the first plane is a horizontal plane at which the winding is located.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
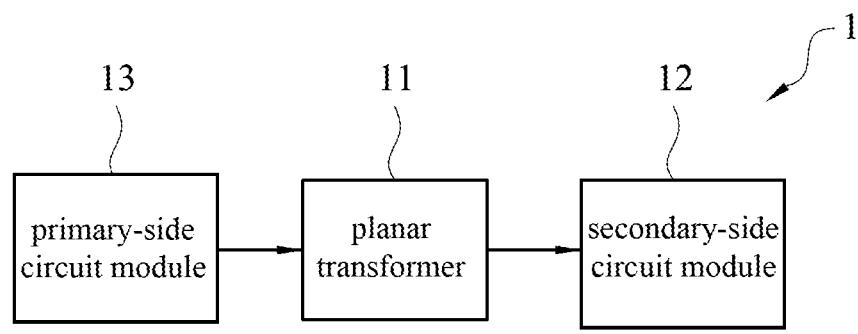
FIG. 1 is a schematic block diagram showing of circuit principle according to a power converter including a planar transformer.
Figure 2:
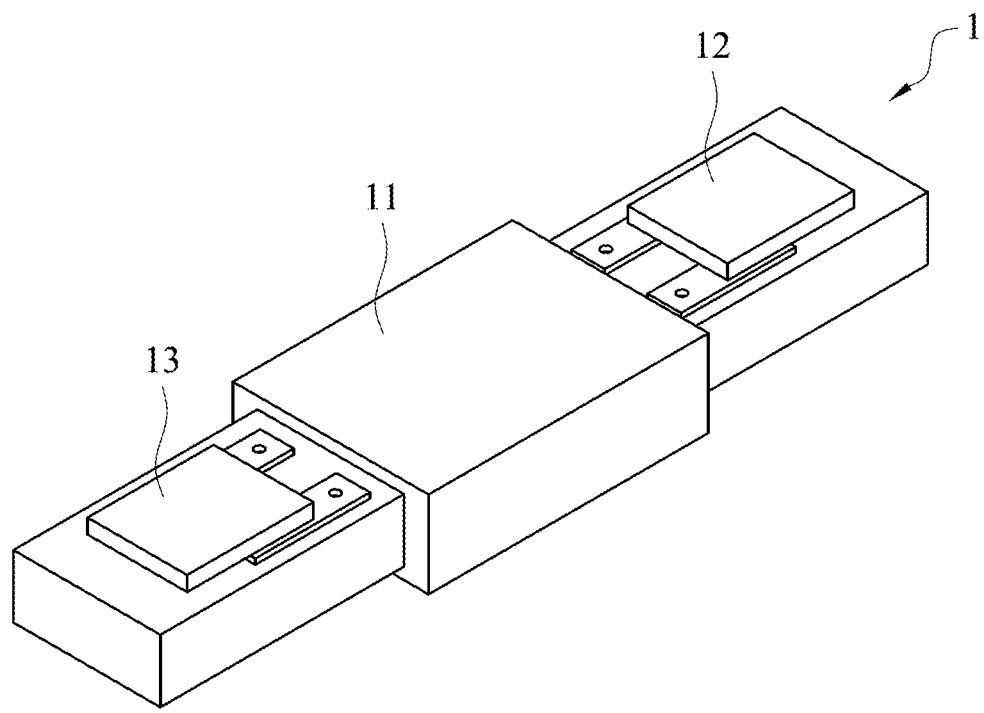
FIG. 2 is a schematic structure diagram showing a power converter having a conventional planar transformer.

Reference will now be made in detail to the present embodiments of the disclosure, examples of which are illustrated in the accompanying drawings. Wherever possible, the same reference numbers are used in the drawings and the description to refer to the same or like parts.

$1^{st}$ Embodiment

Figure 3A:
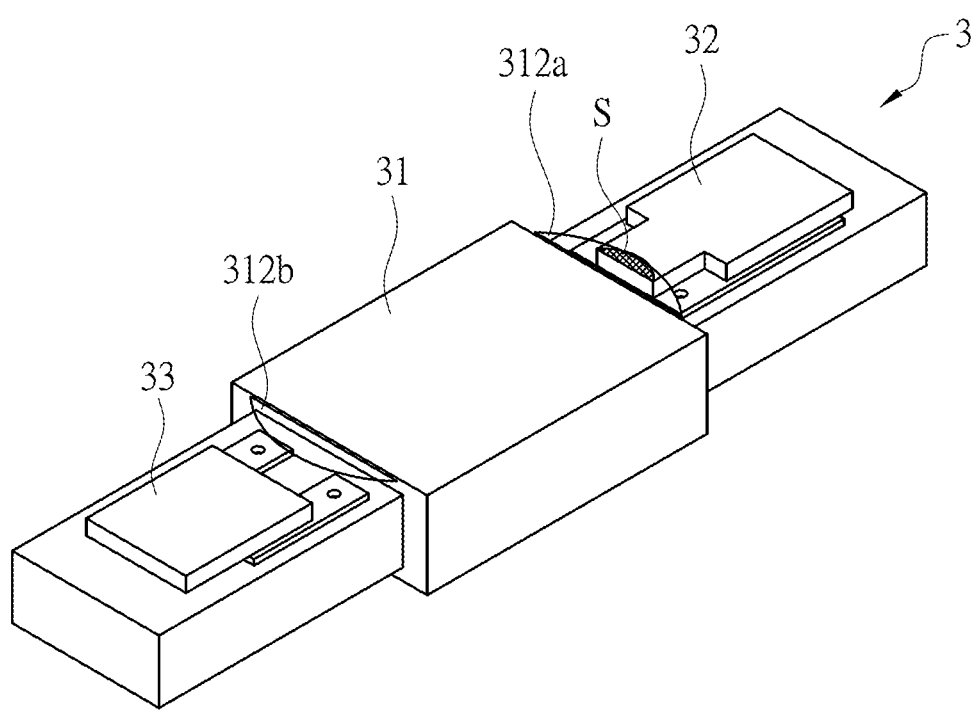
FIG. 3A is a schematic structure diagram showing an electronic device according to a $1^{st}$ embodiment of the present disclosure.
Figure 3B:
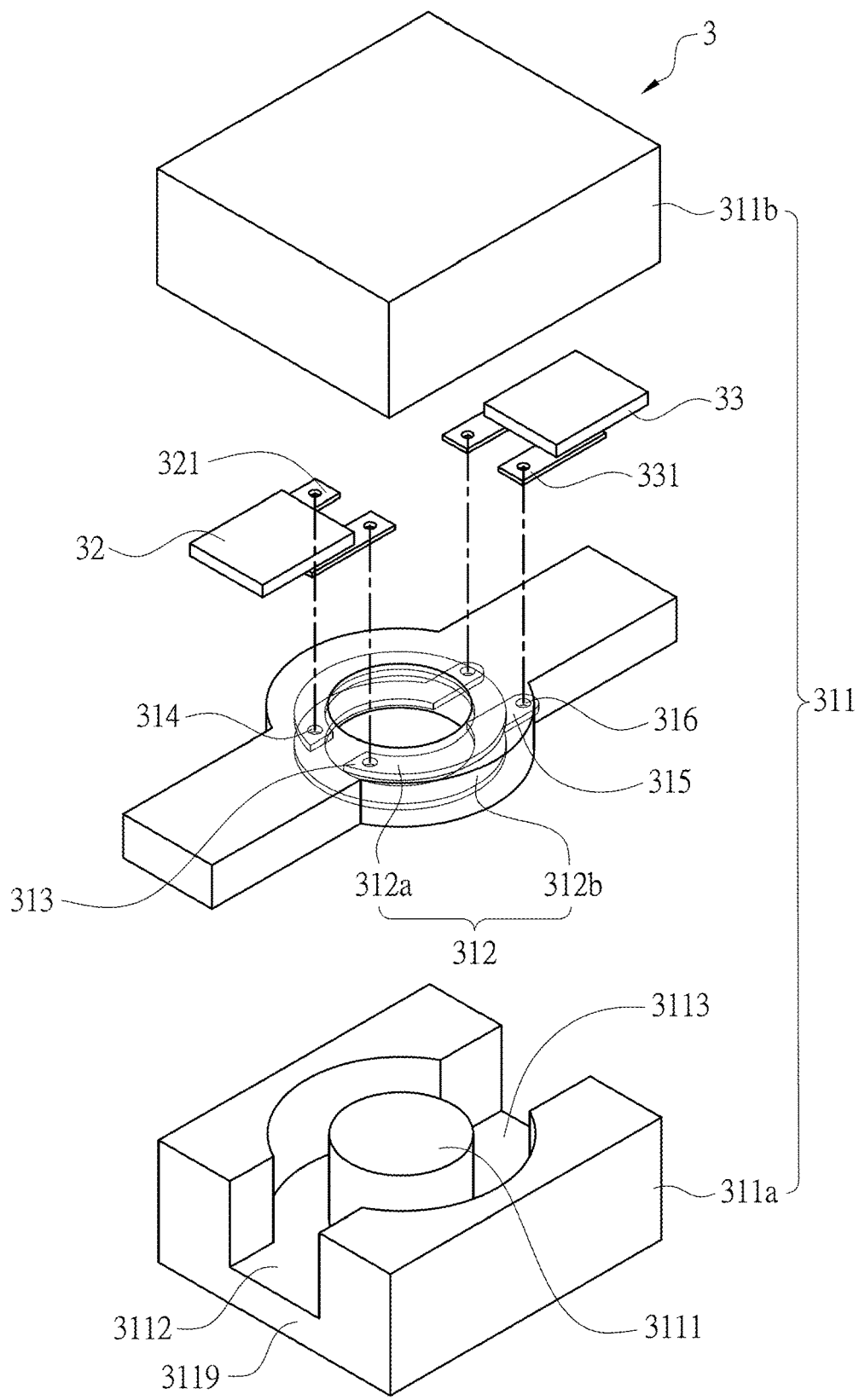
FIG. 3B is an exploded view showing the electronic device shown in FIG. 3A.

Referring to FIGS. 3A and 3B, FIG. 3A is a schematic structure diagram showing an electronic device according to a $1^{st}$ embodiment of the present disclosure, and FIG. 3B is an exploded view showing the electronic device shown in FIG. 3A As shown in FIGS. 3A and 3B, an electronic device includes a magnetic element (such as transformer module) 31, a second circuit module 32 and a first circuit module 33.

The magnetic element 31 includes a magnetic core set 311 and a winding 312. The magnetic core set 311 includes a first magnetic core component 311a and a second magnetic core component 311b corresponding to the first magnetic core component 311a. The first magnetic core component 311a having a magnetic core column 3111, a secondary-side opening 3112, a primary-side opening 3113 and a core cover plate 3119. The winding 312 includes a second winding (such as secondary winding) 312a and the first winding (such as primary winding) 312b; the winding 312 is assembled on the magnetic core set 311. Specifically, the winding 312 is assembled between the first magnetic core component 311a and the second magnetic core component 311b, and mounted on the magnetic core column 3111.

Generally speaking, a portion of a magnetic core on which the winding is coiled is referred to as a magnetic core column (such as the magnetic core column 3111). The magnetic core column generally is cylindrical or cuboid, and the core cover plate (such as the core cover plate 3119) is disposed in parallel on both opposite sides of the magnetic core column, and the core cover plate is perpendicular to the magnetic core column. Furthermore, side columns (such as magnetic core side columns 3114 and 3115 described later) are disposed in parallel with the magnetic core column, and perpendicular to the core cover plate.

The second circuit module 32 is couple to the second winding (such as a secondary winding) 312a of the magnetic element 31; and the first circuit module 33 is coupled to the first winding (such as a primary winding) 312b of the magnetic element 31. For example, the second circuit module 32 may be a rectifier circuit module, such as a rectifier circuit structure of a half-wave rectifier circuit or a center-tap full-wave rectifier circuit.

Both ends of the second winding (such as the secondary winding) 312a are coupled to the second circuit module 32 through a secondary-side outlet connector. The secondary-side outlet connector includes a secondary-side inner outlet connector 313, secondary-side outlet connector vias 314 and a secondary-side outer outlet connector 321, wherein the secondary-side inner outlet connector 313 is electronically connected to the secondary-side outer outlet connector 321 through the secondary-side outlet connector vias 314. Likewise, both ends of the first winding (such as the primary winding) 312b are coupled to the first circuit module 33 through a primary-side outlet connector. The primary-side outlet connector has a primary-side inner outlet connector 315, primary-side outlet connector vias 316 and a primary-side outer outlet connector 331, wherein the primary-side inner outlet connector 315 is electronically connected to the primary-side outlet connector 331 through the primary-side outlet connector vias 316. The secondary-side outlet connector vias 314 may also be disposed on an outside area of the second winding (such as the secondary winding) 312a, but is not limited thereto, and may also be disposed between the second winding 312a and the magnetic core column 3111, or on the second winding 312a. Likewise, the primary-side outlet connector vias 316 may be disposed on an outside area of the first winding (such as the primary winding) 312b, but is not limited thereto, and may also be disposed between the first winding 312b and the magnetic core column 3111, or on the first winding 312b.

At least one uncovered area exists between areas of a first plane on which the first magnetic core component 311a and the second magnetic core component 311b is vertically projected, and an area of the first plane on which the winding 312 is vertically projected (the uncovered area is a portion of the vertical projection area of the winding 312 on the first plane which is not covered by the vertical projection areas of the first magnetic core element 311a or the second magnetic element 311b on the first plane, and may be disposed on the secondary side or the primary side). The first plane is a horizontal plane at which the second winding 312a is located.

In this embodiment, the vertical projection areas of the first magnetic core component 311a of the magnetic core set 311 on the first plane have an overlap portion with the vertical projection area of the second magnetic core component 311b on the first plane. An uncovered area (not shown) exists at the secondary side between the vertical projection areas of the first magnetic core component 311a and the second magnetic core component 311b on the first plane and the vertical projection area of the winding 312 on the first plane, and meanwhile, the second circuit module 32 is moved toward the magnetic core column 3111, and is vertically projected within the uncover area, such that the vertical projection areas of the second circuit module 32 and the winding 312 (the second winding 312a specifically) on the first plane have an overlap portion S, thereby reducing the lengths of the secondary-side inner outlet connector 313 and the outer outlet connector 321. Thus, in comparison with the existing technology, an area of a secondary-side outlet connector loop formed from the second circuit module 32, the secondary-side outer outlet connector 321, the secondary-side outlet connector vias 314 and the secondary-side inner outlet connector 313 is decreased, thereby decreasing the energy stored in the magnetic field generated from the secondary-side outlet connector loop and reducing its leakage inductance.

In this embodiment, the magnetic element 31 may be a planar transformer, i.e., the winding 312 is a planar winding. For example, the magnetic element 31 may be a PCB planar winding, a foil planar winding or a planar winding composed of circular wires.

In this embodiment, only the second circuit module 32 is used for explanation, because the number of turns in the secondary winding of a planar transformer is generally less and the leakage inductance of a secondary-side outlet connector occupies quite a high proportion of the leakage inductance of the planar transformer. However, in another embodiment, an uncovered area on the primary side may exist between the vertical projection areas of the first magnetic core component 311a and the second magnetic core component 311b on the first plane and the vertical projection area of the winding 312 on the first plane, and the first circuit module 33 is moved toward the magnetic core column 3111, and is vertically projected on the uncovered area, such that the vertical projection area of the first circuit module 33 has an overlap portion with the vertical projection area of the winding 312 (the first winding 312b specifically) on the first plane, thereby reducing the leakage inductance formed from the primary-side outlet connector loop. In another embodiment, uncovered areas may exist on both of the primary side and the secondary side and also exists between the vertical projection areas of the first magnetic core component 311a and the second magnetic core component 311b on the first plane and the vertical projection area of the winding 312 on the first plane, and the second circuit module 32 and first circuit module 33 are moved toward the direction of the magnetic core column 3111, such that the second circuit module 32 is vertically projected on the uncovered area of secondary side, and the first circuit module 33 is vertically projected on the uncovered area of primary side, and then the vertical projection areas of the second circuit module 32 and the first circuit module 33 have an overlap portion with the vertical projection area of the winding 312 on the first plane, thereby reducing the leakage inductances formed form the secondary-side outlet connector loop and the primary-side outlet connector loop.

$2^{nd}$ Embodiment

Figure 4:
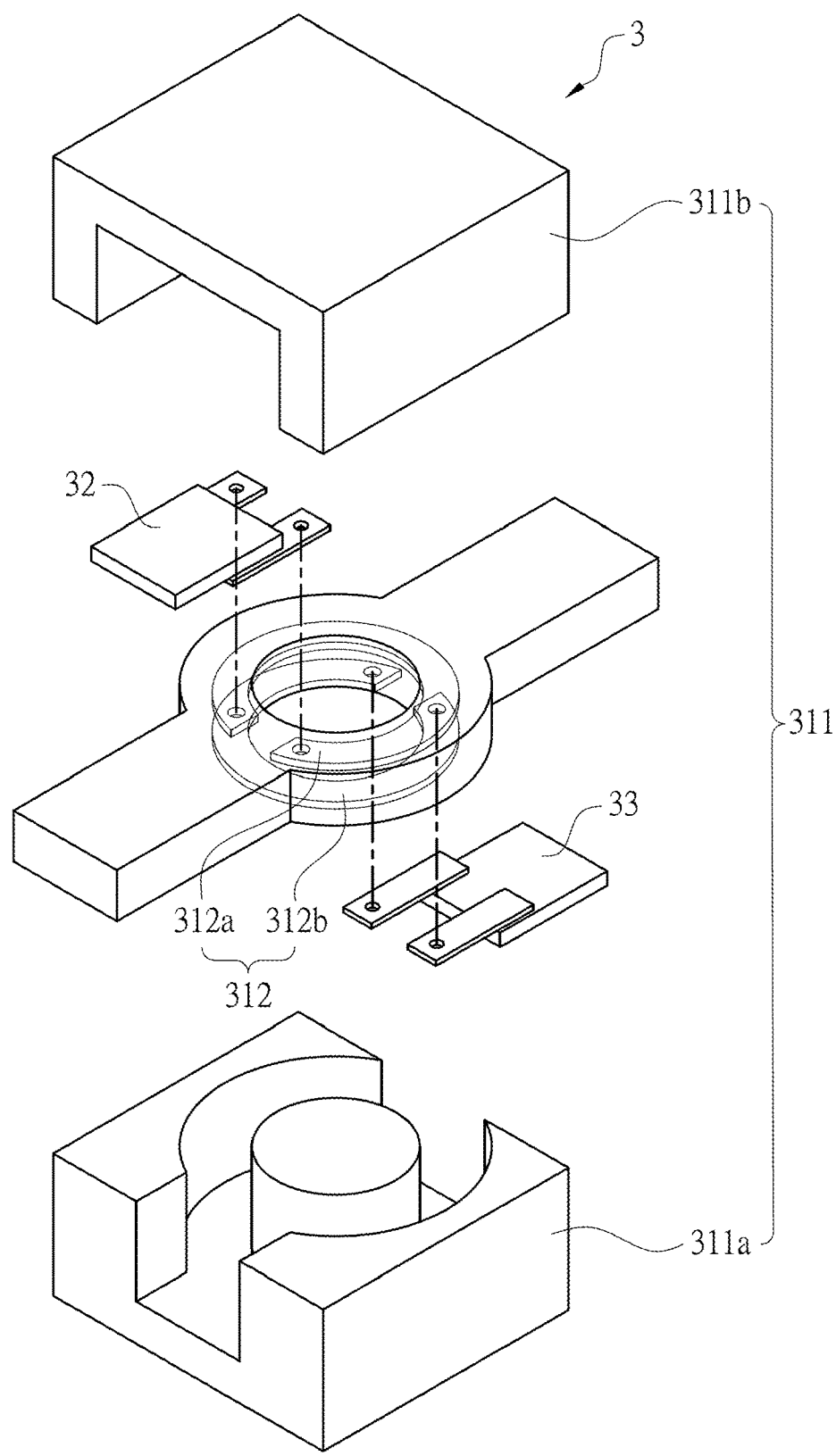
FIG. 4 is an exploded view showing an electronic device according to a 2nd embodiment of the present disclosure.

The difference between a $2^{nd}$ embodiment and the $1^{st}$ embodiment is that the vertical projection areas of the first magnetic core component 311a and the second magnetic core component 311b have no overlap portion, and the first circuit module 33 or the second circuit module 32 have an overlap portion with the vertical projection area of the magnetic core set 311 on the first plane. Referring to FIG. 4, FIG. 4 is a schematic structure diagram showing an electronic device according to the 2$^{nd}$ embodiment of the present disclosure. An uncovered area exists at the secondary side between the vertical projection area of the first magnetic core component 311a on the first plane and the vertical projection area of the winding 312 on the first plane, and meanwhile, an uncovered area exists at the primary side between the vertical projection area of the second magnetic core component 311b on a first plane and the vertical projection area of the winding 312 on the first plane at the same time. At this point, the second circuit module 32 and the first circuit module 33 is moved toward the magnetic core column 3111, such that the second circuit module 32 is vertically projected on the uncovered area of secondary side, and the first circuit module 33 is vertically projected on the uncovered area of primary side, and further the vertical projection area of the second circuit module 32 has an overlap portion with the vertical projection area of the winding 312 on the first plane, and the vertical projection area of the first circuit module 33 has an overlap portion with the vertical projection area of the winding 312 on the first plane. As shown in FIG. 4, the second circuit module 32 is disposed at a side of the second magnetic core component 311b, and is moved toward the second magnetic core component 311b, such that the vertical projections of the second circuit module 32 have an overlap portion with the vertical projections of the second winding 312a on the first plane. The first circuit module 33 is disposed at a side of the core cover plate 3119 of the first magnetic core component 311a, and is moved toward the first magnetic core component 311a, such that the vertical projection area of the first circuit module 33 has an overlap portion with the vertical projection area of the first winding 312b on the first plane. However, it is noted that, in other embodiments, the second circuit module 32 may be disposed at a side of the core cover plate 3119 of the first magnetic core component 311a, or the first circuit module 33 may be disposed at a side of the second magnetic core component 311b, but is not limited thereto. Therefore, the leakage inductance formed from the secondary-side outlet connector loop or/and the primary-side outlet connector loop can be reduced.

With such configuration, at least one of the first circuit module 33 and the second circuit module 32 can have the overlap portion with the vertical projection area of the magnetic core set 311 on the first plane, and thus the size of the electronic device 3 can be further reduced.

3$^{rd}$ Embodiment

Figure 5A:
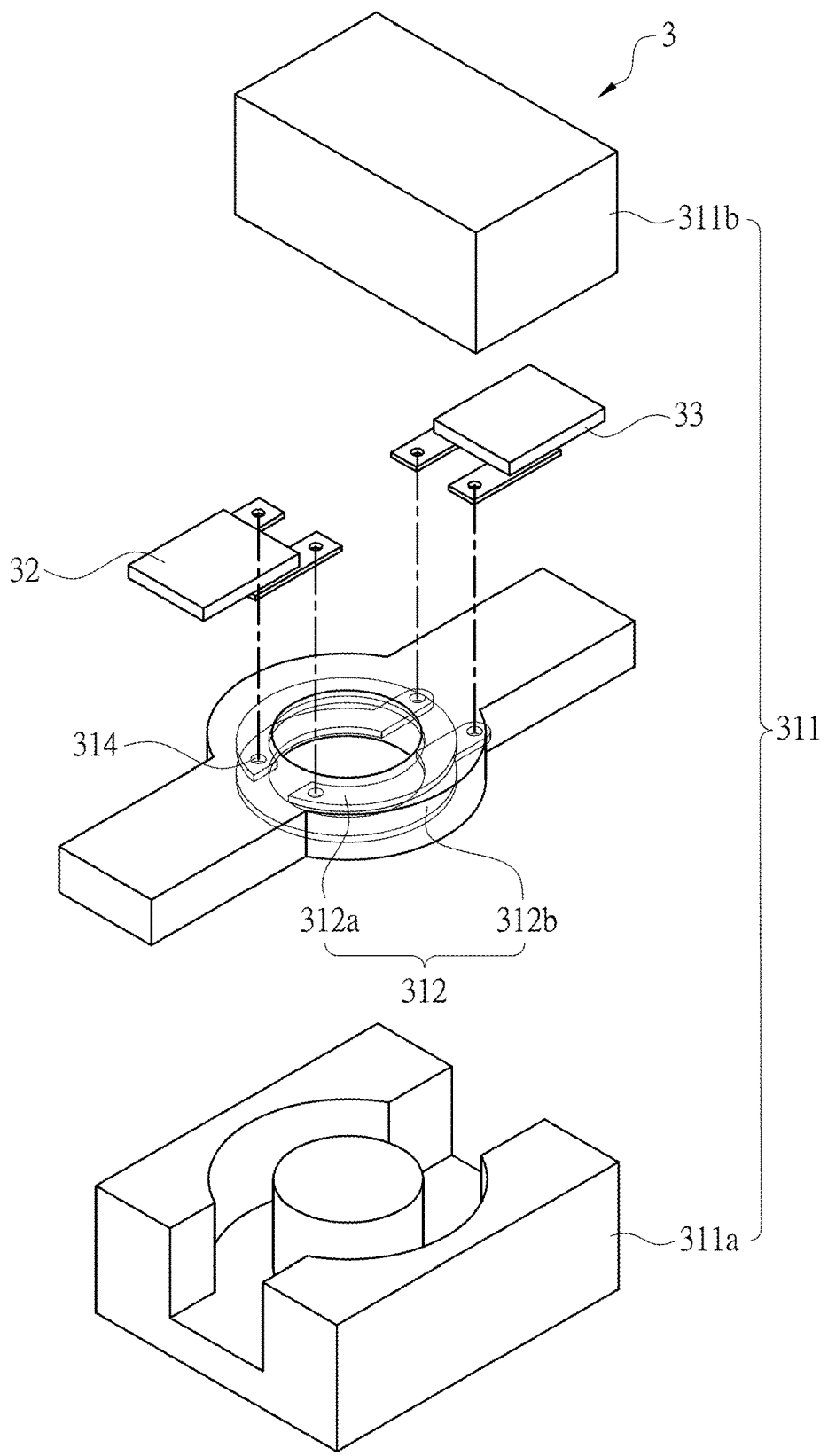
FIG. 5A is an exploded view showing an electronic device according to a 3rd embodiment of the present disclosure.
Figure 5B:
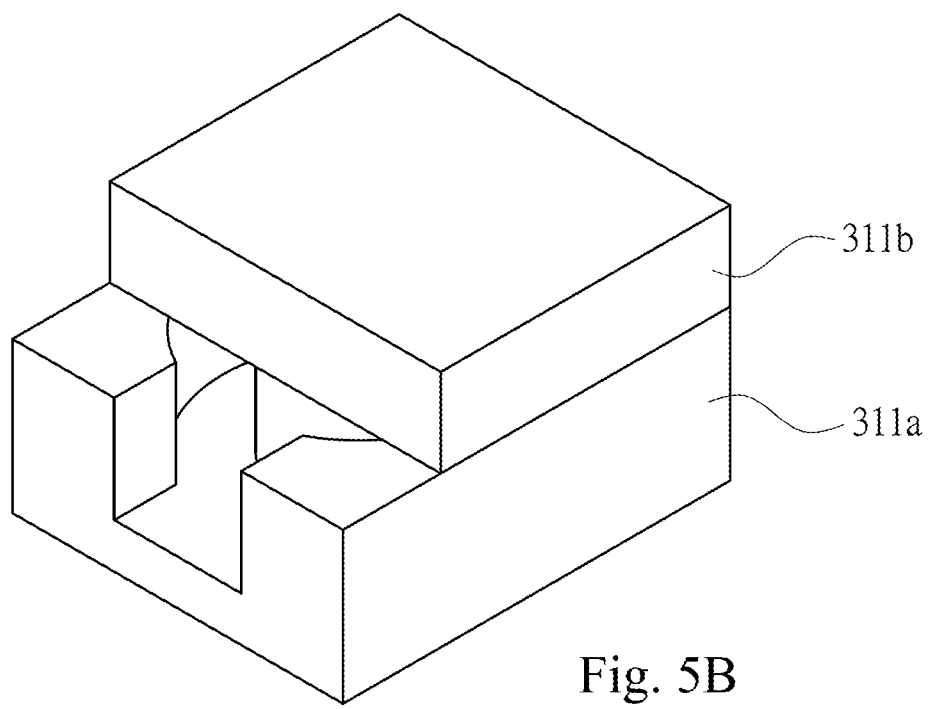
FIG. 5B is a schematic diagram showing a magnetic core set of the electronic device shown in FIG. 5A.

Referring to FIGS. 5A and 5B, FIG. 5A is an exploded view showing an electronic device according to a 3$^{rd}$ embodiment of the present disclosure, and FIG. 5B is a schematic diagram showing a magnetic core set of the electronic device shown in FIG. 5A In this embodiment, the vertical projection area of the first magnetic core component 311a on the first plane may cover the entire vertical projection area of the winding 312 on the first plane, and an uncovered area exists between the vertical projection area of the second magnetic core component 311b on the first plane and the vertical projection area of the winding 312 on the first plane. Alternatively, the vertical projection area of the second magnetic core component 311b may cover the entire vertical projection area of the winding 312 on the first plane, and an uncovered area exists between the vertical projection area of the first magnetic core component 311a on the first plane and the vertical projection area of the winding 312 on the first plane, but is not limited thereto. As shown in the figures, the vertical projection area of the first magnetic core component 311a is as a whole overlapped with the vertical projection area of the winding 312 on the first plane. At this point, a non-overlap area (not shown) exists at the secondary side between the vertical projection areas of the second magnetic core component 311b and the vertical projection area of the winding 312 on the first plane, i.e., the portion of the vertical projection area of the winding 312 on the first plane which is not covered by the vertical projection area of the second magnetic core component 311b on the first plane. If the portion of the vertical projection area of the winding 312 on the first plane is not covered by the vertical projection area of the second magnetic core component 311b on the first plane, the second circuit module 32 is moved toward the second core component 311b, such that at least one of the second circuit module 32 is vertically projected on an uncovered area, and the vertical projection area of the second circuit module 32 on the first plane has an overlap portion with the vertical projection area of the winding 312 on the first plane, thereby reducing the leakage inductance formed from the secondary-side outlet connector loop. It is noted that, in other embodiments, a non-overlap area may exist at the primary side between the vertical projection areas of the second magnetic core component 311b and the winding 312 on the first plane, and the first circuit module 33 is moved toward the direction of the magnetic core component 311b, and further at least one portion of the first circuit module 33 is vertically projected on the uncovered area, and the vertical projection areas of the first circuit module 33 and the winding 312 on the first plane have an overlap portion, thereby reducing the leakage inductance formed from the primary-side outlet connector loop.

Similarly, in this embodiment, at least one of the first circuit module 33 and the second module 32 can also have the overlap portion with the vertical projection area of the magnetic core set 311 on the first plane. Compared with the 1st embodiment, the size of the electronic device 3 of this embodiment can be further reduced.

4$^{th}$ Embodiment

Figure 6:
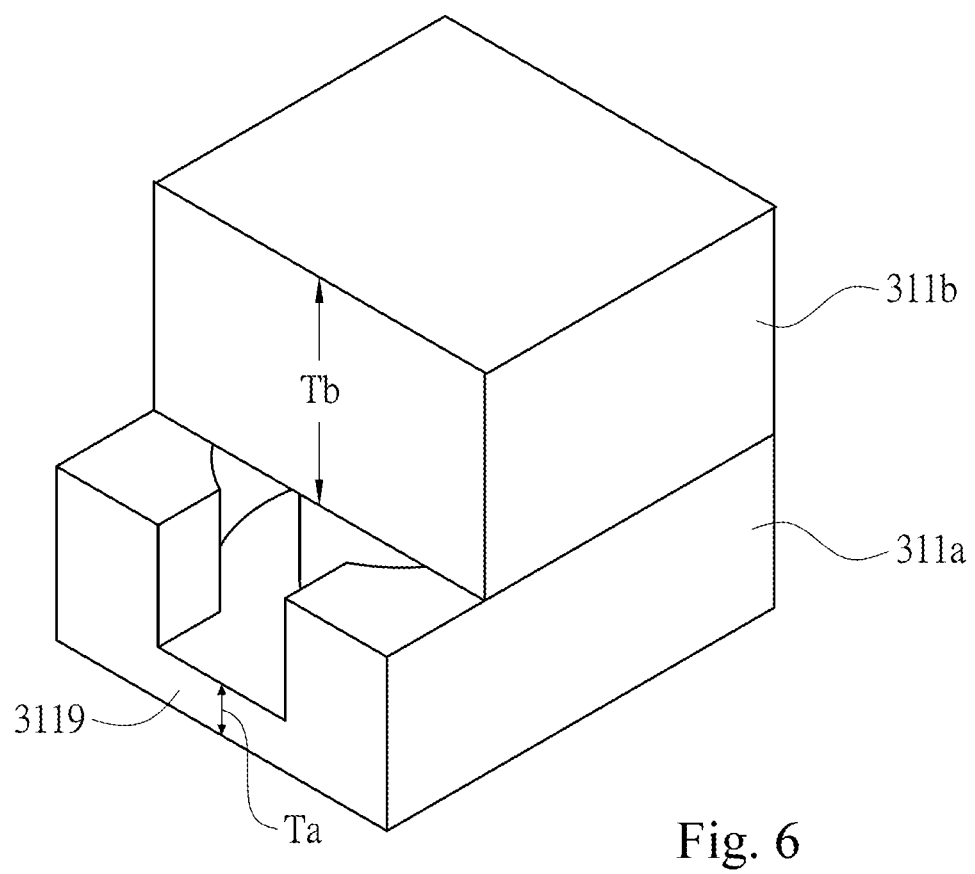
FIG. 6 is a schematic structure diagram showing a magnetic core set according to a $4^{th}$ embodiment of the present disclosure.

Referring to FIG. 6, FIG. 6 is a schematic structure diagram showing a magnetic core set according to a 4$^{th}$ embodiment of the present disclosure.

The difference between this embodiment and the 3rd embodiment is that a thickness Ta of the core cover plate 3119 of the first magnetic core component 311a is smaller than a thickness Tb of the second magnetic core component 311b. By this magnetic core set structure, and in comparison with the 3rd embodiment using the same magnetic core material, this magnetic core set structure has a lower magnetic core loss than the magnetic core set structure shown in FIG. 5B. In other embodiments, a thickness of the core cover plate 3119 of the first magnetic core component 311a may be greater than a thickness of the second core magnetic core component 311b, to reduce the magnetic core loss.

5$^{th}$ Embodiment

Figure 7:
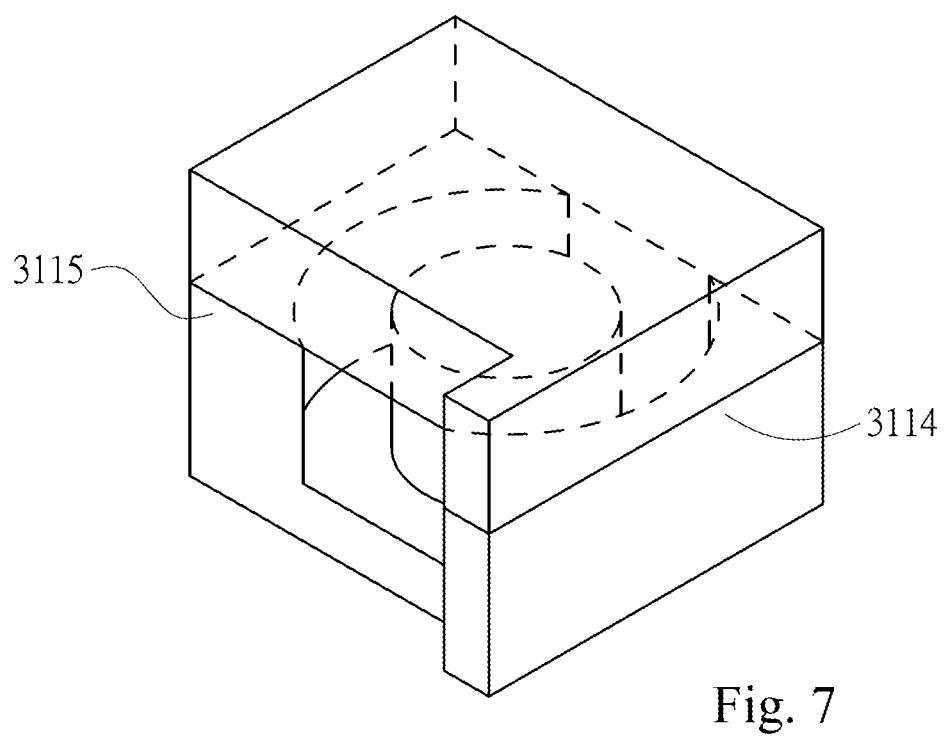
FIG. 7 is a schematic structure diagram showing a magnetic core set according to a $5^{th}$ embodiment of the present disclosure.

Referring to FIG. 7, FIG. 7 is a schematic structure diagram showing a magnetic core set according to a 5$^{th}$ embodiment of the present disclosure.

The difference between this embodiment and the 1st embodiment is a side column 3114 and a side column 3115 in the magnetic core set 311 is not symmetric to the magnetic core column 3111. As shown in the figure, the lengths of the side columns 3114 and 3115 in the magnetic core 311 are different, i.e. the length of side column of 3114 is greater than the length of side column of 3115.

6th Embodiment

Figure 8:
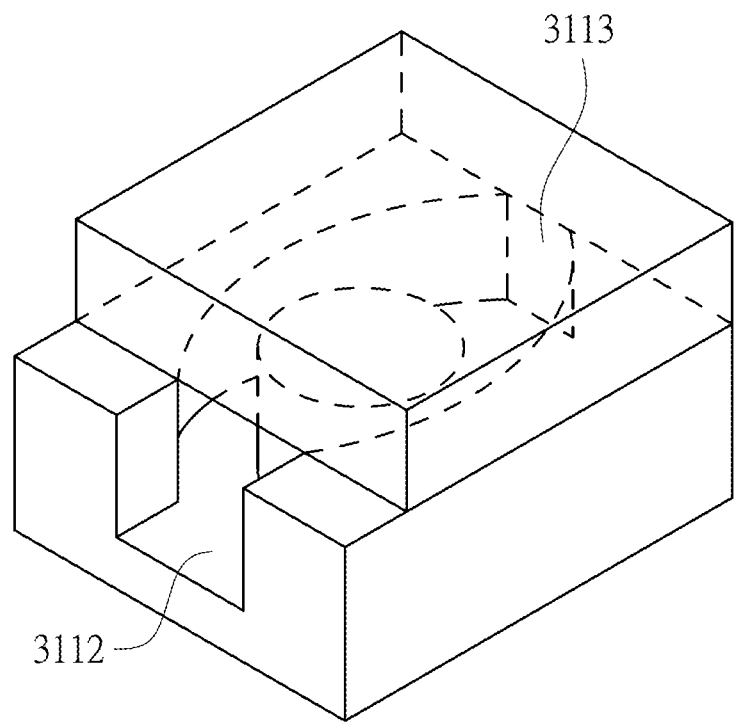
FIG. 8 is a schematic structure diagram showing a magnetic core set according to a $6^{th}$ embodiment of the present disclosure.

Referring to FIG. 8, FIG. 8 is a schematic structure diagram showing a magnetic core set according to a 6th embodiment of the present disclosure.

This embodiment is based on the 3rd to 5th embodiments, the secondary-side opening 3112 and the primary-side opening 3113 is not symmetric in shape with respect to the magnetic core column 3111. Specifically, the magnetic side column 3114 and 3115 are both extended toward the primary-side opening 3113 along their curved profiles to increase the sizes of the side column 3115 and 3115.

7th Embodiment

Figure 9A:
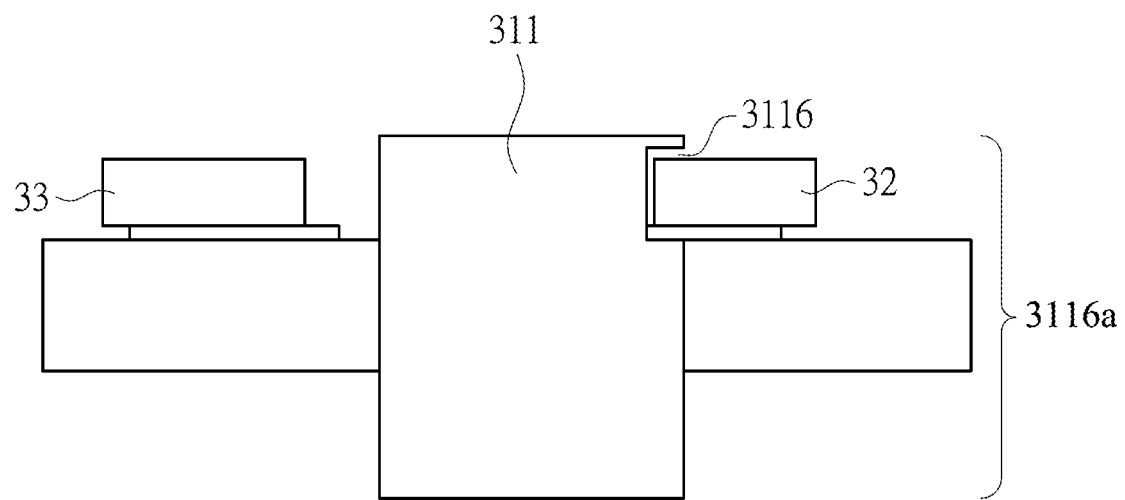
FIG. 9A is a schematic structure diagram showing an electronic device according to a $7^{th}$ embodiment of the present disclosure.
Figure 9B:
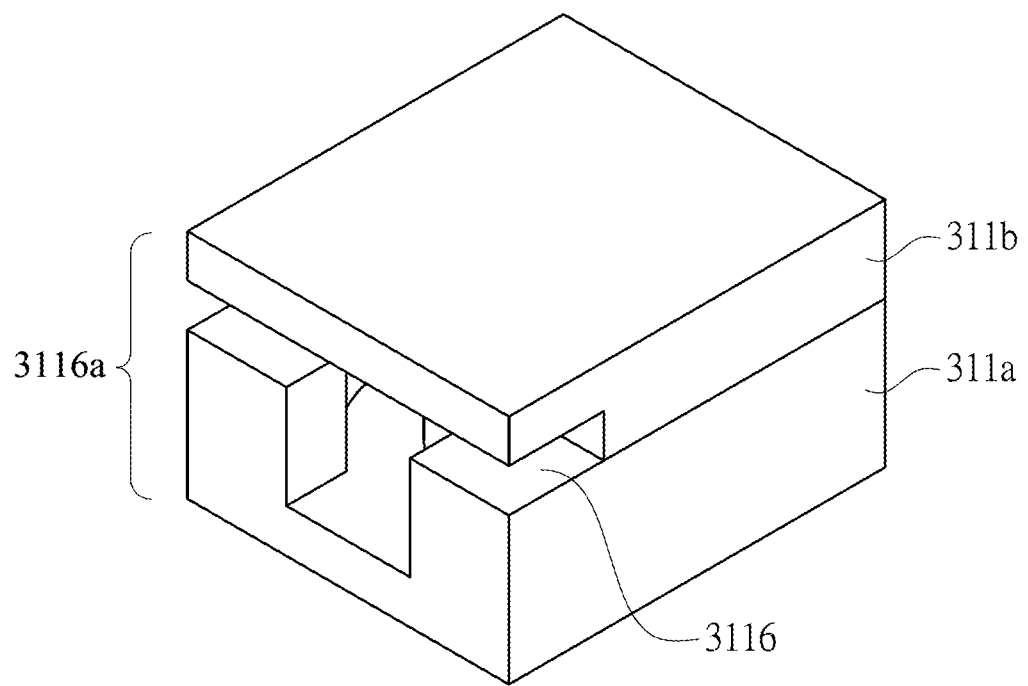
FIG. 9B is a schematic structure diagram showing a magnetic core set of the electronic device shown in FIG. 9A.

Referring to FIGS. 9A and 9B, FIG. 9A is a schematic structure diagram showing an electronic device according to a 7th embodiment of the present disclosure, and FIG. 9B is a schematic structure diagram showing a magnetic core set of the electronic device shown in FIG. 9A.

In this embodiment, the vertical projection area of the first magnetic core component 311a of the magnetic element 311 on the first plane cover the entire vertical projection area of the winding on the first plane, and the vertical projection area of the second magnetic core component 311b of the magnetic element 311 on the first plane cover the entire vertical projection area of the winding on the first plane. A groove 3116 is defined on the second core magnetic 311b of the magnetic set 311, and the second circuit module 32 is disposed in the groove 3116, such that the second circuit module 32 has an overlap portion with the vertical projection area of the winding on the first plane. It is noted that, in other embodiments, a groove may be defined on the first magnetic core component 311a, and at least one portion of the second circuit module 32 is disposed in the groove 3116; and at least one portion of the first circuit module 33 may also be disposed in the groove.

In other words, a side view of the first core magnetic component 311a having the groove 3116 or the second core magnetic component 311b having the groove 3116 substantially forms a stairs type architecture 3116a. At least one portion of the second circuit module 32 or at least one portion of the first circuit module 33 can be disposed in the stairs type architecture 3116a. Further, the embodiments in FIG. 5B, FIG. 6, and FIG. 8 also have the analogous stairs type architecture, and thus the repetitious descriptions are not given here.

With such configuration, at least one portion of the second circuit module 32 or at least one portion of the first circuit module 33 can be disposed in the groove 3116, and thus the second circuit module 32 or the first circuit module 33 has an overlap portion with the vertical projection area of the magnetic core set 311 on the first plane.

8th Embodiment

Figure 10:
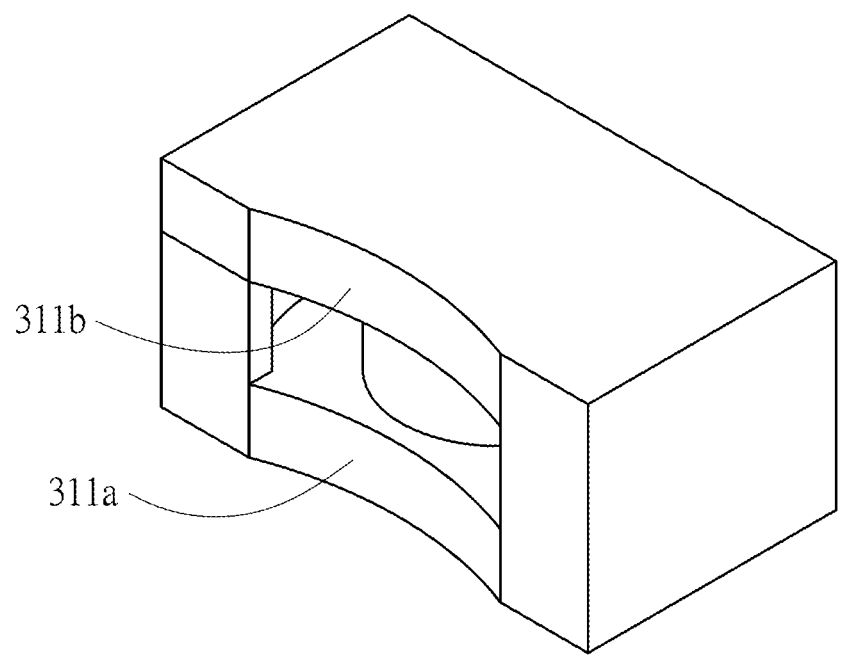
FIG. 10 is a schematic structure diagram showing a magnetic core set according to an $8^{th}$ embodiment of the present disclosure.

Referring to FIG. 10, FIG. 10 is a schematic diagram of structure showing a magnetic core set according to an 8th embodiment of the present disclosure.

The difference between this embodiment and the 1st embodiment is that the first magnetic core component 311a and the second magnetic core component 311b are concave arc shapes along the secondary-side opening 3112 or the primary-side opening 3113, such that the second circuit module 32 or the first circuit module 33 is moved toward the magnetic core column 3111 correspondingly. Therefore, in this embodiment, at least one portion of the second circuit module 32 or at least one portion of the first circuit module 33 can be disposed in the magnetic core set 311, and thus the first circuit module 33 or the second circuit module 32 can have an overlap portion with the vertical projection area of the magnetic core set 311 on the first plane.

9th Embodiment

Figure 11:
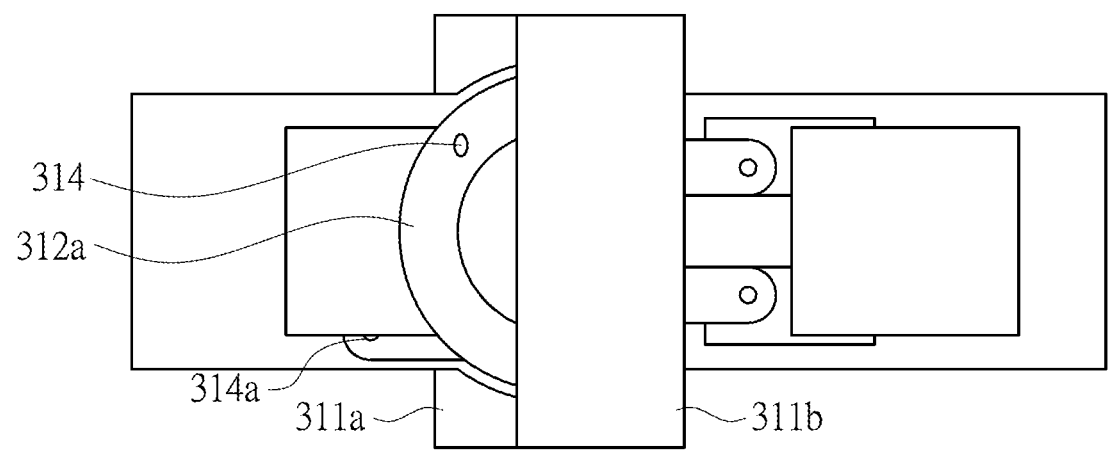
FIG. 11 is a schematic structure diagram showing an electronic device according to a $9^{th}$ embodiment of the present disclosure.

Referring to FIG. 11, FIG. 11 is a schematic diagram of structure showing an electronic device according to a 9th embodiment of the present disclosure.

The difference between this embodiment and the 3rd embodiment is that secondary-side outlet connector vias 314a is disposed on the outside area of winding 312a, and another secondary-side outlet connector vias 314 are disposed on an area of the winding 312a.

10th Embodiment

Figure 12A:
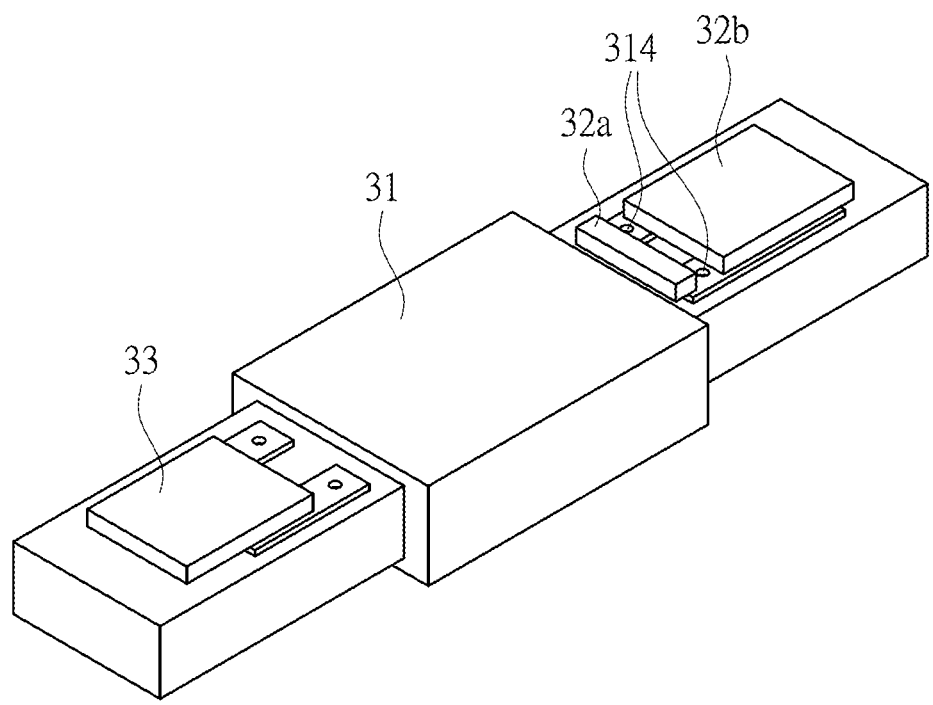
FIG. 12A is a schematic structure diagram showing an electronic device according to a $10^{th}$ embodiment of the present disclosure.

Referring to FIG. 12A, FIG. 12A is a schematic structure diagram showing an electronic device according to a 10th embodiment of the present disclosure.

In this embodiment, the second circuit module 32 is divided into two circuit modules 32a and 32b, and the circuit module 32a includes the elements that are sensitive to leakage inductance, and the circuit module 32b includes the elements that are not sensitive to leakage inductance. In some embodiments, the elements sensitive to leakage inductance includes the circuit modules formed by switches and capacitors. Alternatively, in some other embodiments, when the circuit module 32a includes parallel capacitors and other components, the elements sensitive to leakage inductance includes a loop formed by the winding and the capacitor closest to the winding. The circuit module 32a is disposed at a side of the secondary-side outlet connector vias 314 close to the magnetic core set 31. For example, a switch, a capacitor, etc., are disposed at a side close to the magnetic core set 31, and the circuit module 32b is disposed at another side away from the magnetic core set 31.

Taking FIG. 13 (see later) as example, the switch D and the capacitor C are coupled to the winding Ns, and the switch Q is coupled to the winding NP, wherein the switch D, the switch Q and the capacitor C are considered as the elements sensitive to leakage inductance. Thus, these elements are required to be disposed at a side close to the magnetic core. For illustration, the switch Q should be disposed at the side of the primary-side outlet connector vias close to the magnetic core set, and the switch D and the capacitor C should be disposed at the side of the secondary-side outlet connector vias close to the magnetic core set.

Alternatively, taking the full wave rectifying circuit shown in FIG. 14 as example, the switch SW1, the switch SW2, and the parallel output capacitors C1, C2 are coupled to the winding 312d, wherein the elements sensitive to leakage inductance includes the switch SW1, the switch SW2 and the capacitor disposed at the location being closest to the switch SW1, the switch SW2, or the winding 312d, such as the capacitor C1. Thus, these elements should be disposed at a side of the corresponding windings close to the magnetic core. In regard to the capacitor C2, as the capacitor C2 is in parallel with the capacitor C1 and the distance between the capacitor C2 and the switches SW1, SW2 is much greater, the capacitor C2 is considered as the element insensitive to leakage inductance.

Figure 12B:
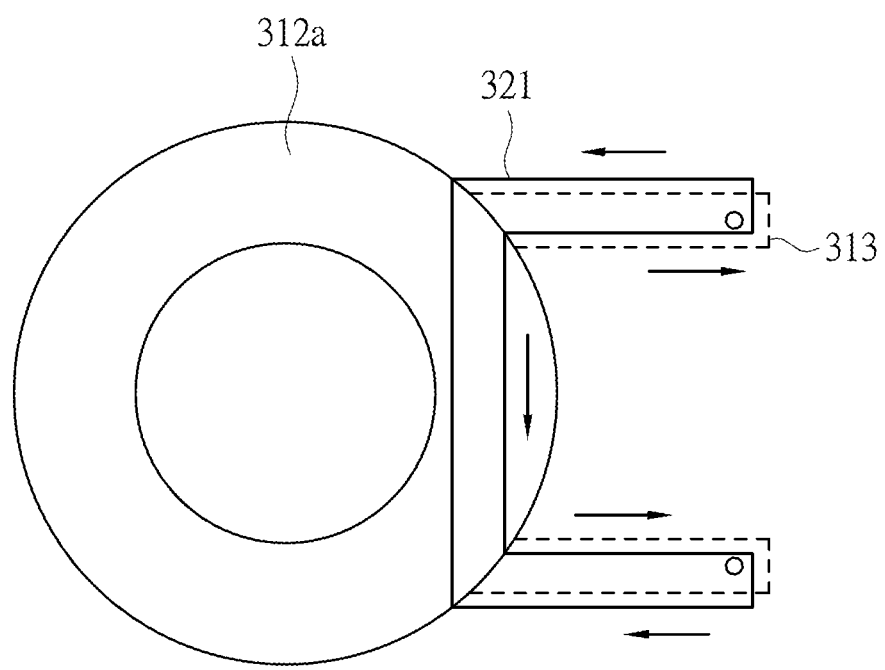
FIG. 12B is a schematic diagram showing the principle of a secondary-side outlet connector of the electronic device shown in FIG. 12A.

Further referring to FIG. 12B, FIG. 12B is a schematic diagram showing the principle of a secondary-side outlet connector of the electronic device shown in FIG. 12A.

As shown in FIG. 12B, the secondary-side outer outlet connector 321 is parallel to the secondary-side inner outlet connector 313, and the influence of the leakage inductance of the secondary-side outlet connector can be greatly reduced because the currents flowing therein are equivalent in size and opposite in directions, and the magnetic fields generated are offset to each other.

Especially, the aforementioned phenomenon is apparent when the magnetic core set of the $3^{rd}$ $4^{th}$ $5^{th}$ $6^{th}$ $7^{th}$ or $8^{th}$ embodiment is used as the magnetic core set 31. Experimental results show that: for a specific planar transformer, the structure of FIG. 12A has a total leakage inductance of 1.13 uH, and the total leakage inductance is composed of the leakage inductance in window and the leakage inductance of the secondary-side outlet connector, wherein the leakage inductance in window is 0.72 uH. In this embodiment, the total leakage inductance is reduced to 0.77 uH. That is, the leakage inductance of the secondary-side outlet connector is reduced from 0.41 uH to 0.05 uH, and the leakage inductance generated from secondary-side is almost eliminated.

It is noted that, the aforementioned embodiment is described to mainly improve the layout of the second circuit module 32 to have an overlap portion with the projection area of the winding 312 on the first plane, but in some other embodiments, the first circuit module 33 can be processed similarly to have an overlap portion with the projection area of the winding 312 or the magnetic core set 311.

$11^{th}$ Embodiment

Figure 13:
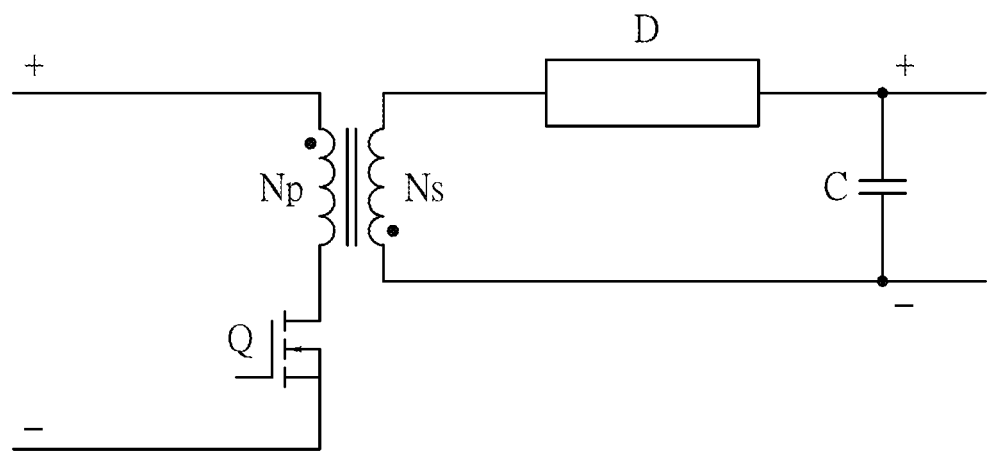
FIG. 13 is a schematic circuit diagram showing a transformer according to an $11^{th}$ embodiment of the present disclosure.

Referring to FIG. 13, FIG. 13 is a schematic circuit diagram showing a transformer according to an $11^{th}$ embodiment of the present disclosure.

As shown in FIG. 13, a primary-side circuit includes a primary winding Np and a switch Q, and the secondary-side circuit includes a secondary winding Ns, a switch D (such as a switch diode) and a capacitor C.

The 1st to 10th embodiments are relatively suitable for use in a flyback converter shown in FIG. 13. The decrease of leakage inductance may effectively promote the efficiency of a flyback converter, lower a voltage peak of the switch Q at the primary side when the switch Q is turned off instantaneously, and prevent a breakdown of the switch Q at the primary side. However, the electronic devices shown in the $1^{st}$ to $10^{th}$ embodiments are not limited to this converter, and those skilled in the art may make replacements in accordance with actual applications.

Figure 14A:
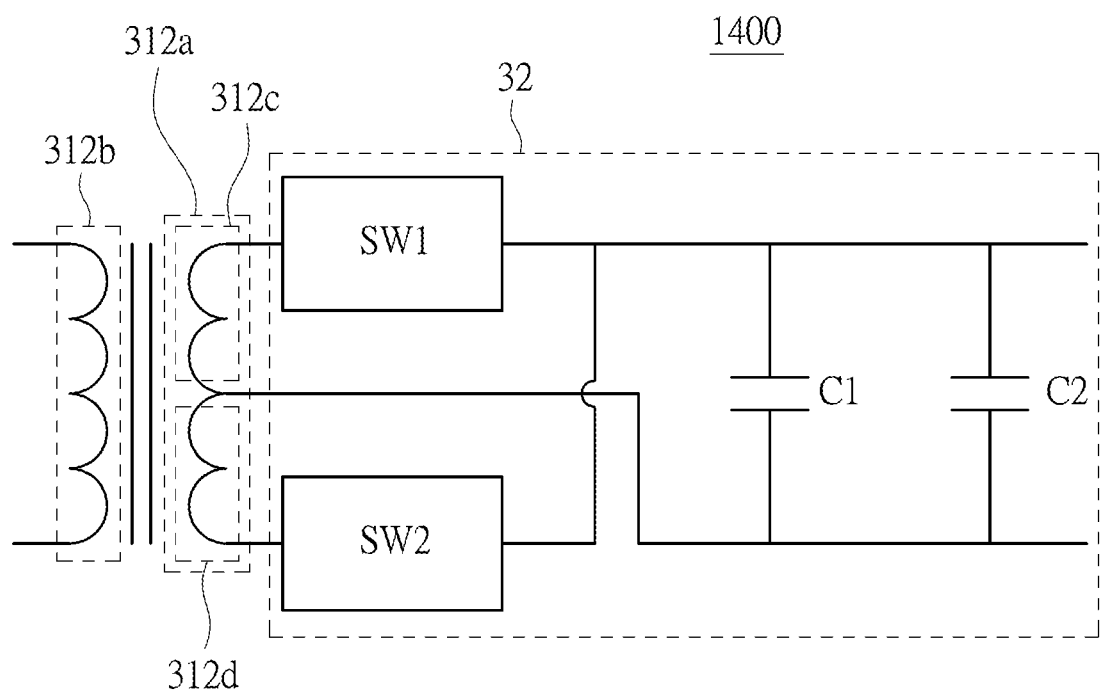
FIG. 14A is a schematic diagram showing a center-tap full-wave rectifier circuit.

Referring to FIG. 14A, FIG. 14A is a schematic diagram showing a center-tap full-wave rectifier circuit.

As shown in FIG. 14A, a second circuit module 32 of a center-tap full-wave rectifier circuit 1400 includes a first switch module SW1, a second switch module SW2, a first capacitor module C1 and a second capacitor module C2. The first switch module SW1 and the first capacitor module C1 are coupled to a first secondary winding component 312c of the winding (such as a secondary winding) 312a, and the second switch module SW2 and the second capacitor module C2 are coupled to a second secondary winding component 312d of the winding 312a.

More embodiments are provided in the blow, and the connection structure described in the aforementioned electronic device 3 can be used to realize the center-tap full-wave rectifier circuit 1400 shown in FIG. 14, but the present disclosure is not limited to the following embodiments.

$12^{th}$ Embodiment

Figure 14B:
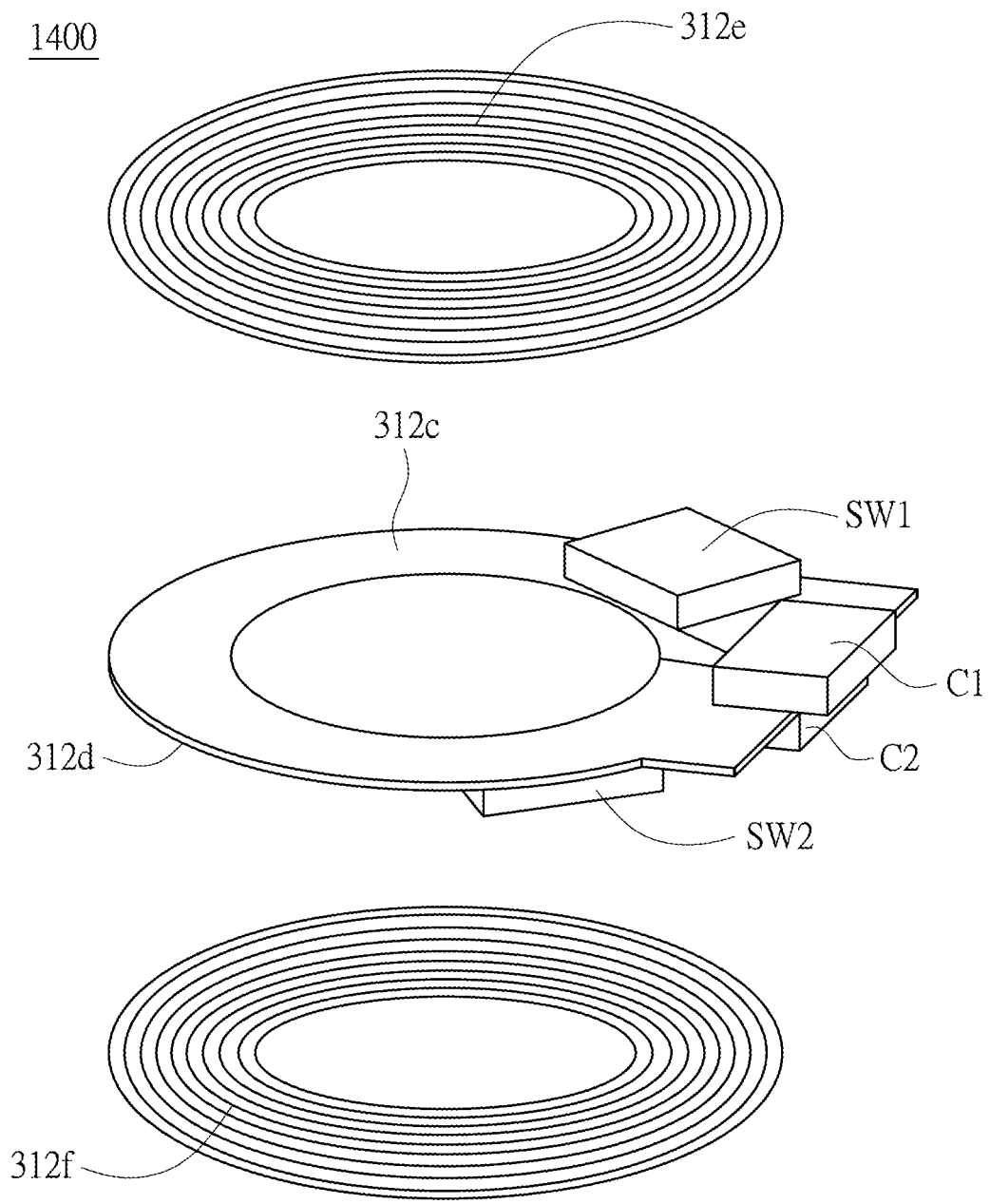
FIG. 14B is an exploded view showing the electronic device shown according to a $12^{th}$ embodiment of the present disclosure.

Referring to FIG. 14B, FIG. 14B is an exploded view showing the electronic device shown according to a $12^{th}$ embodiment of the present disclosure.

The first winding (such as a primary winding) 312b of the center-tap full-wave rectifier circuit 1400 is divided into a first primary winding component 312e and a second primary winding component 312f. For example, the first primary winding component 312e and the second primary winding component 312f may be planar windings formed from wires, and the second winding (such as secondary winding) 312a of the center-tap full-wave rectifier circuit 1400 may be a winding structure of a two-layer PCB board, and the winding of the upper PCB board is the first secondary winding component 312c, and the winding of the lower PCB board is the second secondary winding component 312d.

Figure 14C:
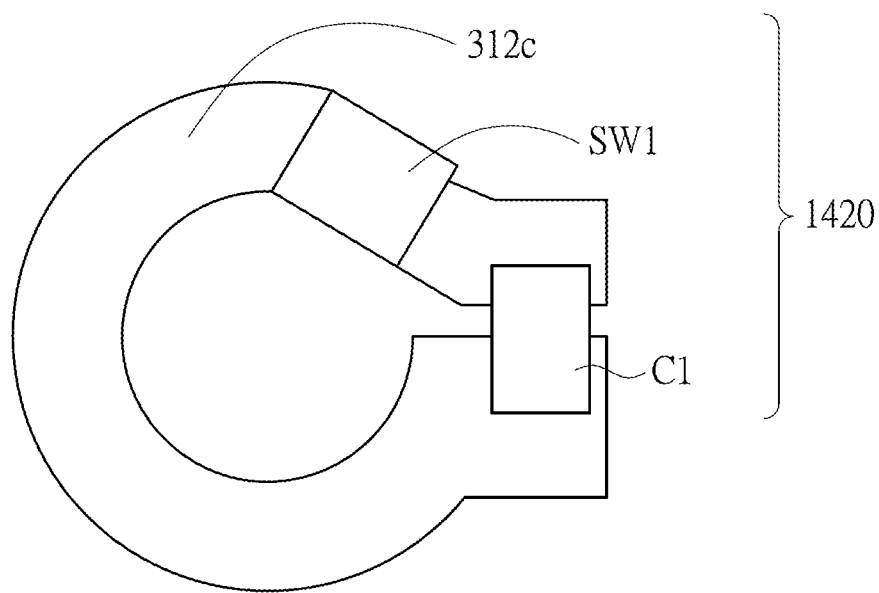
FIG. 14C is a top view showing a second winding shown in FIG. 14B.
Figure 14D:
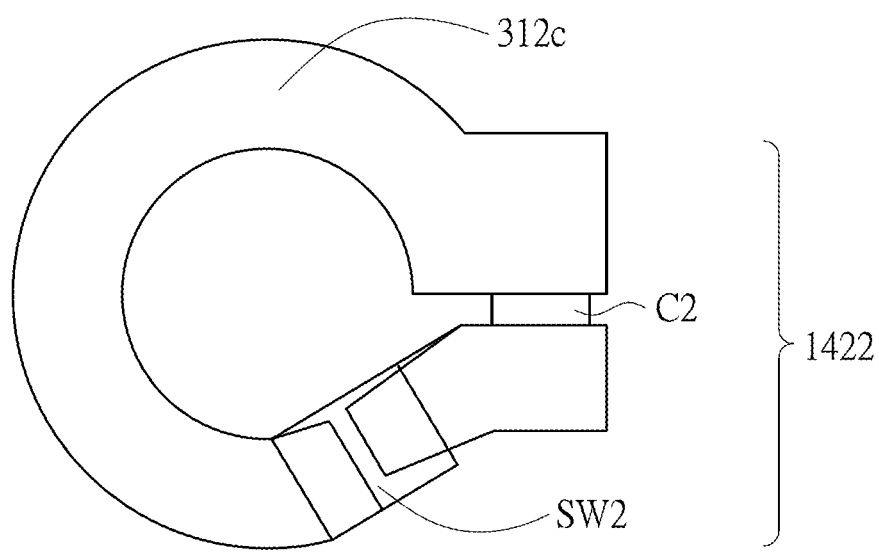
FIG. 14D is a bottom view showing the second secondary winding component shown in FIG. 14B.
Figure 14E:
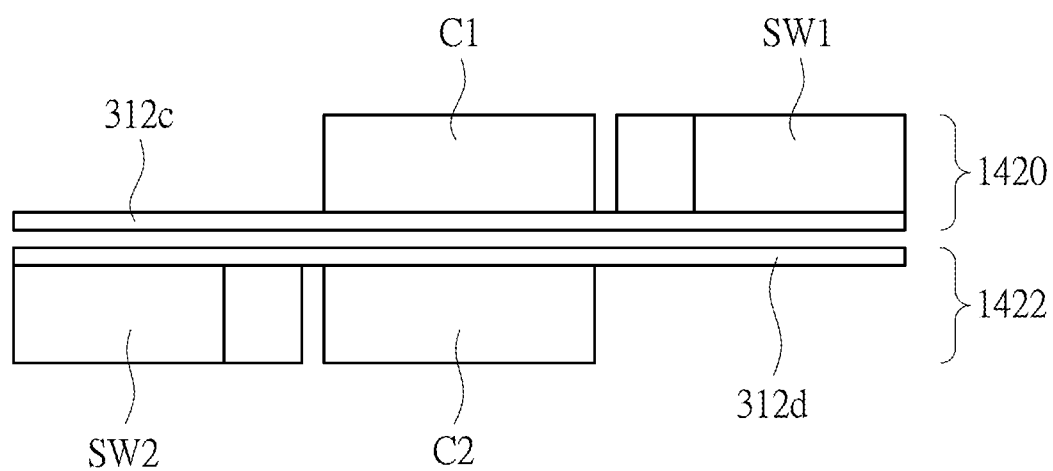
FIG. 14E is a side view showing a second winding shown in FIG. 14B.

Referring to FIGS. 14C, 14D and 14E together, FIG. 14C is a top view of the second winding shown in FIG. 14B, FIG. 14D is a bottom view of the second secondary winding component shown in FIG. 14B, FIG. 14E is a side view of the second winding shown in FIG. 14B.

As shown in FIGS. 14C and 14D, the first switch module SW1 and the first capacitor module C1 are disposed on a top surface of the first secondary winding, and the first secondary winding component 312c, the first switch module SW1 and the first capacitor C1 are coupled to one another to form a first AC loop 1420; and the second switch module SW2 and the second capacitor module C2 are disposed on a bottom surface of the second secondary winding, and the second secondary winding component 312d, and the second switch module SW2 and the second capacitor C2 are coupled to one another to form a second AC loop 1422. The current of the aforementioned AC loops includes quite a lot of AC current component. The configuration structure of the two loops is shown in FIG. 14E, wherein the first capacitor module C1 and the second capacitor module C2 are disposed corresponding to each other.

With the configurations illustrated in FIG. 14B or FIG. 14E, the vertical projection areas of the second circuit module 32 and the winding 312 (or the magnetic core set 311) on the first plane can have an overlap portion, and thus size of the center-tap full-wave rectifier circuit 1400 can be reduced.

Referring to FIGS. 14B, 14C and 14D, the vertical projection areas of the first primary winding 312e and its AC loop (not shown) on the first plane is defined as a first projection surface; the vertical projection areas of the second primary winding 312f and its AC loop (not shown) on the first plane is defined as a second projection surface; the vertical projection area of the aforementioned first AC loop 1420 on the first plane is defined as a third projection surface; and the vertical projection area of the aforementioned second AC loop 1422 on the first plane is defined as a fourth projection surface. In FIG. 14B, an area ratio of the third projection surface to an overlap area of the first, second, third and fourth projection surfaces is in a range from about 1 to about 1.2; and an area ratio of the fourth projection surface to an overlap area of the first, second, third and fourth projection surfaces is in a range from about 1 to about 1.2. In other words, in this embodiment, an area ratio of a vertical projection area of any AC loop around the same magnetic core column on the first plane to an overlap portion of the vertical projection area of all of the loops around the same magnetic core column of a magnetic core set on the first plane is in a range from about 1 to about 1.2.

Therefore, for the structure in this embodiment, this embodiment cuts off a planar winding of the magnetic element at an arbitrary position and connects the windings with the circuit modules having the connection relationships therewith, thereby shortening the length of the circuit loop and the size of the entire element, further increasing the couplings between the windings, thus reducing the leakage inductance between the windings, and the equivalent resistance and parasitic capacitor of the loop. Furthermore, the second circuit module 32 in this embodiment is formed from the first switch module SW1 and the first capacitor C1 or formed form the second switch module SW2 and the second capacitor C2, but is not limited thereto. The second circuit module 32 may be a rectifier circuit module and can be flexibly replaced by those skilled in the art.

Moreover, the element structure in this embodiment is also suitable for a full-wave rectifier circuit using only one capacitor. For example, the aforementioned first capacitor C1 may be disposed on a top surface of the first secondary winding component 312c and couple to the first switch module SW1, and the aforementioned second switch module SW2 may be disposed on a bottom surface of the second secondary winding component 312d, and the second switch module SW2 may couple to the first capacitor C1 by vias disposed on the secondary winding 312b.

Besides, the first switch module SW1 or the second switch module SW2 in this embodiment can be a chip, and the chip is disposed in a PCB board. The first capacitor module C1 or the second capacitor module C2 may be operated by directly using a capacitor element or may be formed by mixing a dielectric material into a PCB base material, thereby further reducing the size of the element. Moreover, the winding structure in this embodiment is not limited to an arrangement order "primary side-secondary side-secondary side-primary side" only and those skilled in the art may make corresponding changes, such as "secondary side-primary side-primary side-secondary side".

13$^{th}$ Embodiment

Figure 15A:
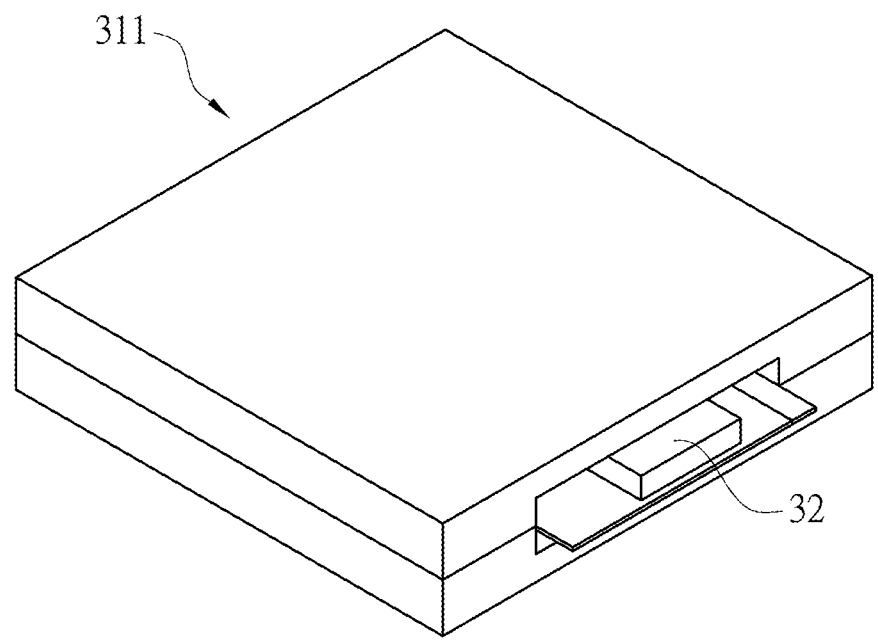
FIG. 15A is a schematic structure diagram showing an electronic device according to a $13^{th}$ embodiment of the present disclosure.

Referring to FIG. 15A, FIG. 15A is a schematic structure diagram showing an electronic device according to a 13$^{th}$ embodiment of the present disclosure. As shown in FIG. 15A, in this embodiment, vertical projection areas of the magnetic core set 311 has an overlap portion with the vertical projection of the second circuit module 32 on the first plane.

Figure 15B:
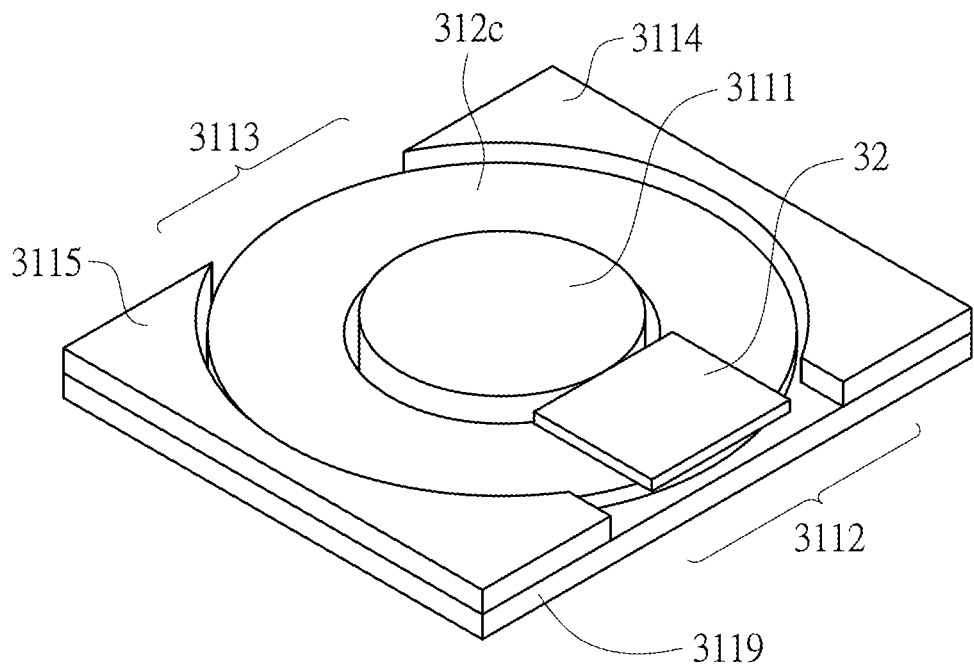
FIG. 15B is a schematic structure diagram showing a magnetic core set shown in FIG. 15A.

Referring to FIG. 15B, FIG. 15B is a schematic structure diagram showing a magnetic core set shown in FIG. 15A. A width of the aforementioned second circuit module 32 is too large to be disposed in the magnetic core set 311. As shown in FIG. 15B, the secondary-side opening 3112 and the primary-side opening 3113 are not symmetric with respect to the magnetic core column 3111 in the magnetic core set, and the second circuit module 32 is disposed in the wider one of the primary-side opening 3113 and the secondary-side opening 3112. Using FIG. 15B as an example, the second circuit module 32 may be disposed in the secondary opening 3112. Through this arrangement, an area ratio of the vertical projection area of the aforementioned AC loop on the first plane to the overlap portion of the vertical projection areas of all of the loops around the same column of the magnetic core set on the first plane can be in a range less than 1.2.

14$^{th}$ Embodiment

Figure 16A:
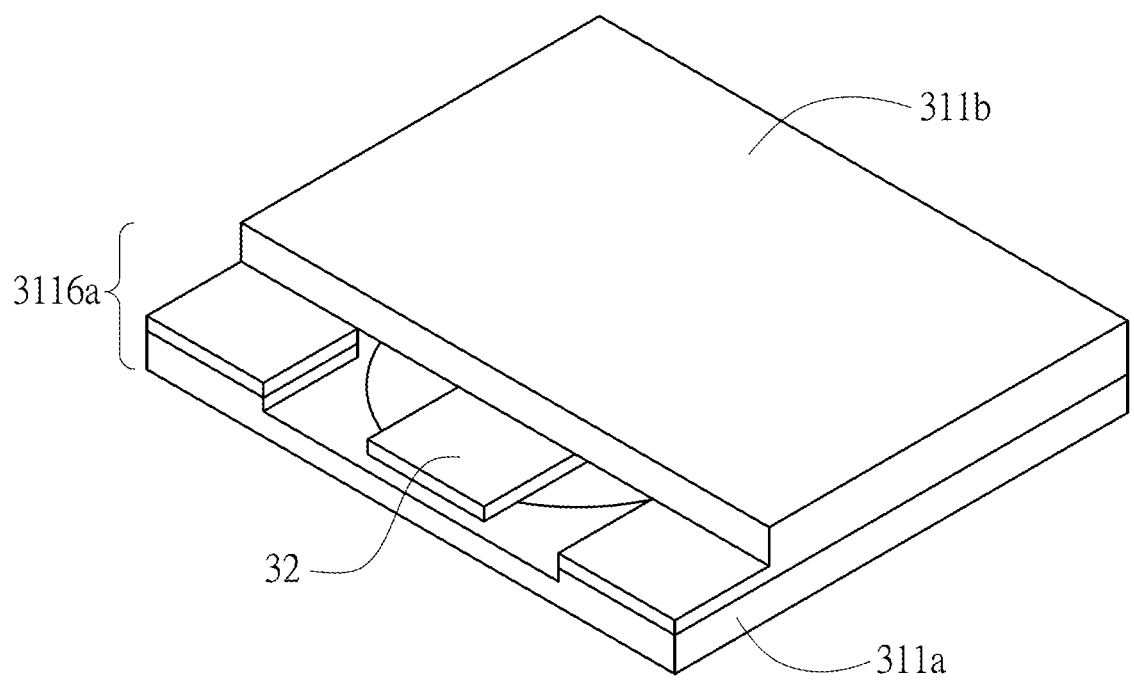
FIG. 16A is a schematic structure diagram showing an electronic device according to a $14^{th}$ embodiment of the present disclosure.
Figure 16B:
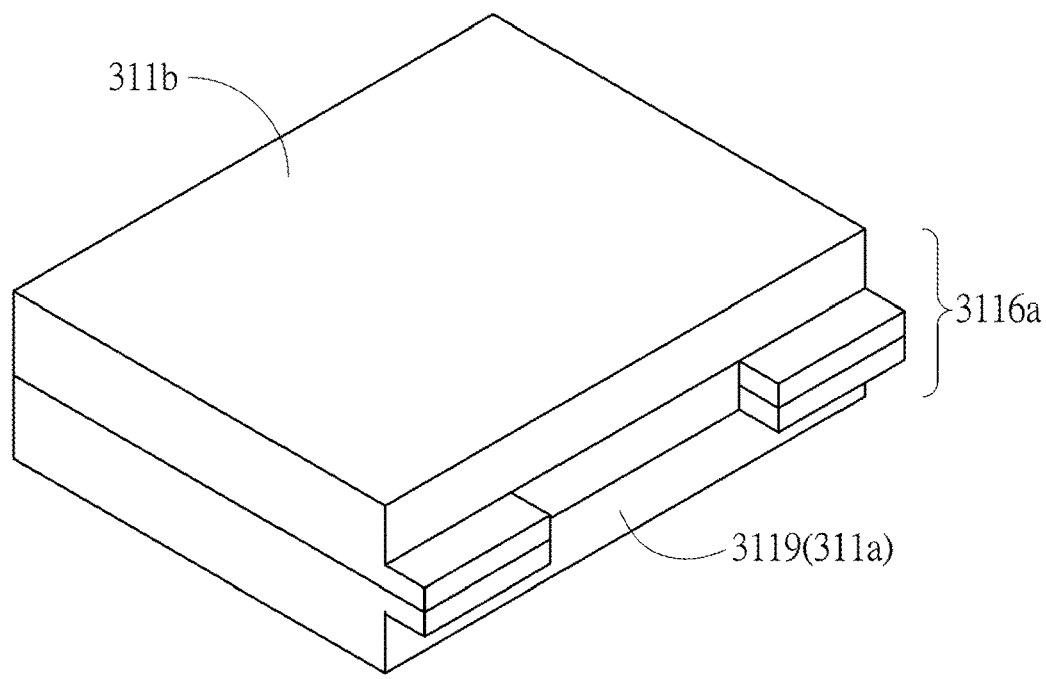
FIG. 16B is another schematic structure diagram showing an electronic device according to a $14^{th}$ embodiment of the present disclosure.
Figure 16C:
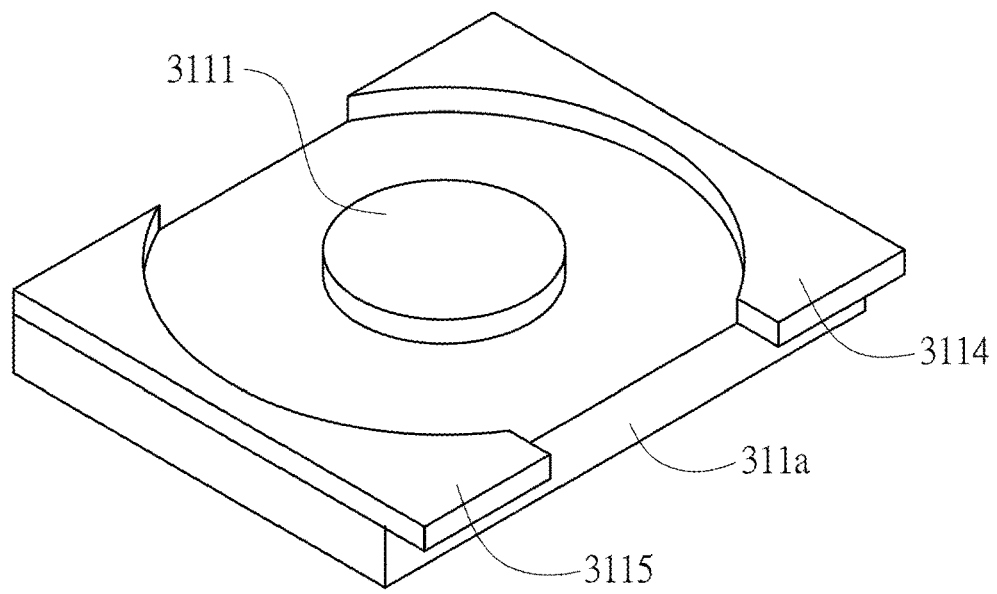
FIG. 16C is a schematic structure diagram showing a magnetic core set shown in FIG. 16B.

Referring to FIG. 16A, FIG. 16A is a schematic structure diagram showing an electronic device according to a 14$^{th}$ embodiment of the present disclosure. As shown in FIG. 16A, in this embodiment, the vertical projection area of the second core component 311b on the first plane falls within a vertical projection area of the core cover plate 3119 of the first magnetic core component 311a on the first plane. The height of the aforementioned second circuit module 32 is greater than the height of the magnetic core set 311, and the second circuit module 32 is disposed by cutting off a portion of the second magnetic core component 311b. Thus, the vertical projection area of the second circuit module 32 on the first plane can have an overlap portion with the vertical projection area of the first magnetic core component 311a on the first plane. Alternatively, referring to FIG. 16B and FIG. 16C, this embodiment may also dispose the second circuit module 32 by cutting off a portion of each of the top cover plate and the bottom cover plate.

Similarly, in this embodiment, the side views of the first magnetic core component 311a and the second magnetic core component 311b substantially form the stairs type architecture 3116a, and the second circuit module 32 is disposed in the stairs type architecture 3116a.

15$^{th}$ Embodiment

Figure 16D:
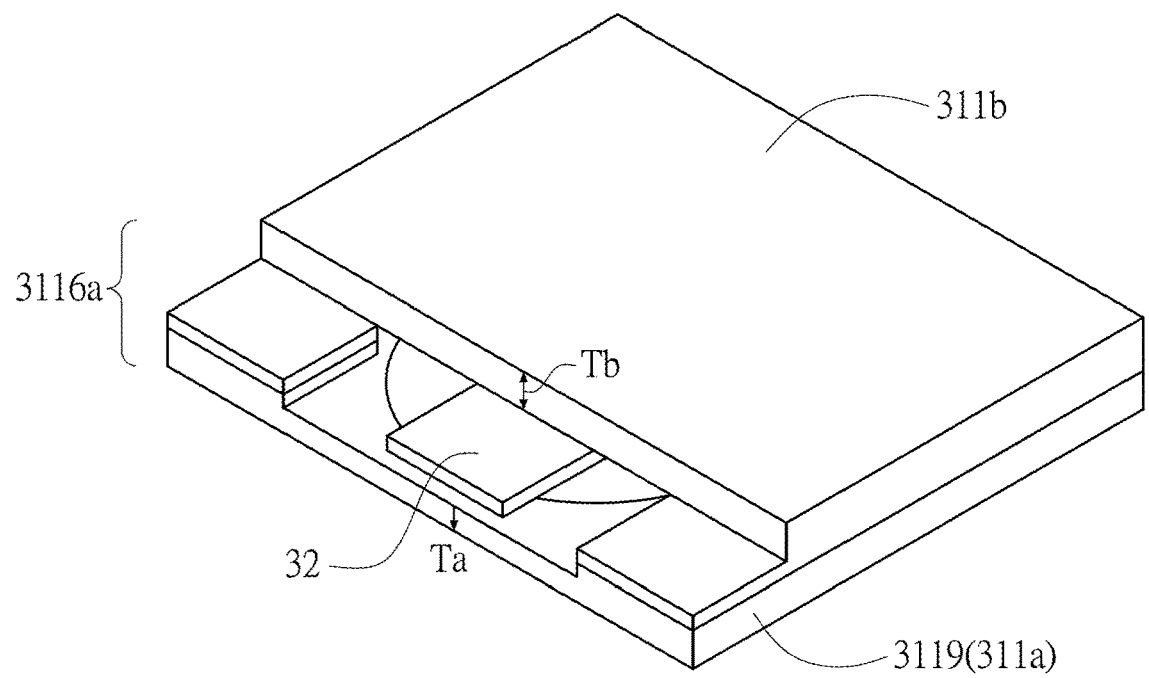
FIG. 16D is a schematic structure diagram showing an electronic device according to a $15^{th}$ embodiment of the present disclosure.

Referring to FIG. 16D, FIG. 16D is a schematic structure diagram showing an electronic device according to a 15$^{th}$ embodiment of the present disclosure. The difference between the 15$^{th}$ embodiment and the 14$^{th}$ embodiment is that a thickness Tb of the second magnetic core component 311b is greater than a thickness Ta of the core cover plate 3119 of the first magnetic core component 311a.

16$^{th}$ Embodiment

Referring to FIG. 10, FIG. 10 is a schematic structure diagram showing a magnetic core set of a 16$^{th}$ embodiment of the present disclosure. When a height or a width of the second circuit module 32 is greater than a space in which the magnetic core set 311 can be disposed, as shown in FIG. 10, the first magnetic core component 311a and the second magnetic core component 311b are concave arc shapes along the secondary-side opening 3112 or the primary-side opening 3113, so as to dispose at least one portion of second circuit module 32 in the concave arc area. Thus, the vertical projection area of the second circuit module 32 on the first plane has an overlap portion with the vertical projection area of the first magnetic core component on the first plane, and the vertical projection area of the second circuit module 32 on the first plane has an overlap portion with the vertical projection area of the second magnetic core component on the first plane.

17$^{th}$ Embodiment

Figure 17:
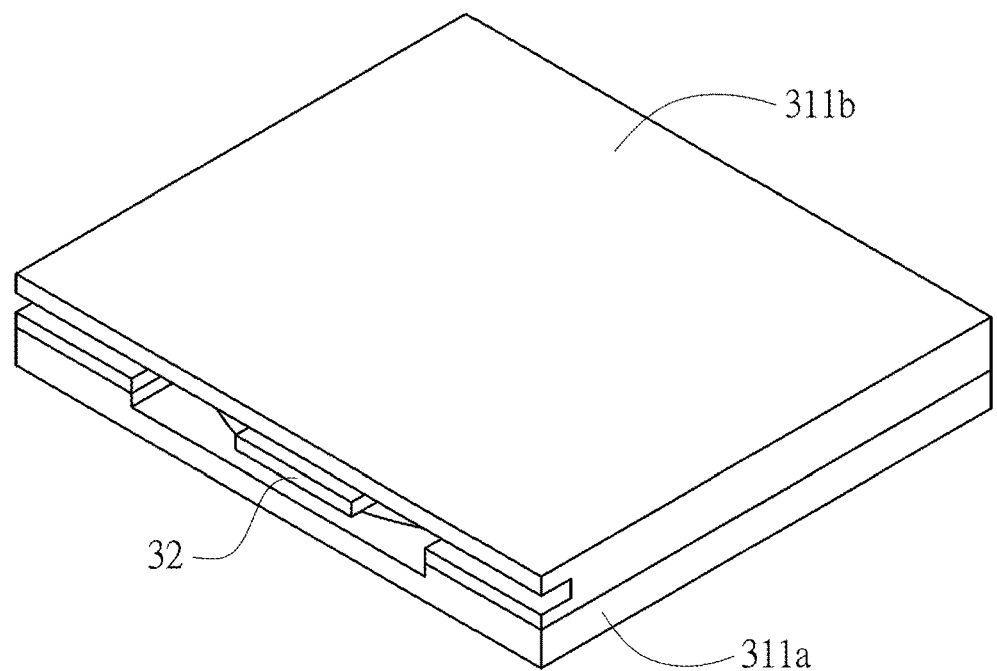
FIG. 17 is a schematic structure diagram showing an electronic device according to a $17^{th}$ embodiment of the present disclosure.

Referring to FIG. 17, FIG. 17 is a schematic structure diagram showing an electronic device according to a 17$^{th}$ embodiment of the present disclosure. When a height or a width of second circuit module 32 is greater than a space in which the magnetic core set 311 can be disposed, an accommodation portion may be disposed in the magnetic core set 311 for receiving at least one portion of the second circuit module 32. As shown in FIG. 17, the accommodation portion has a groove, and the groove may be disposed on the first magnetic core component 311a or the second magnetic core component 311b, and at least one portion of the second circuit module 32 is disposed in the groove, such that the vertical projection areas of the second circuit module 32 and the first magnetic core component 311a on the first plane have an overlap portion, and the vertical projection areas of the second circuit module 32 and the second magnetic core component 311b on the first plane have an overlap portion. Alternatively, the structure of FIG. 9 may be used to adjust the magnetic core set for receiving the circuit module.

18th Embodiment

Figure 18:
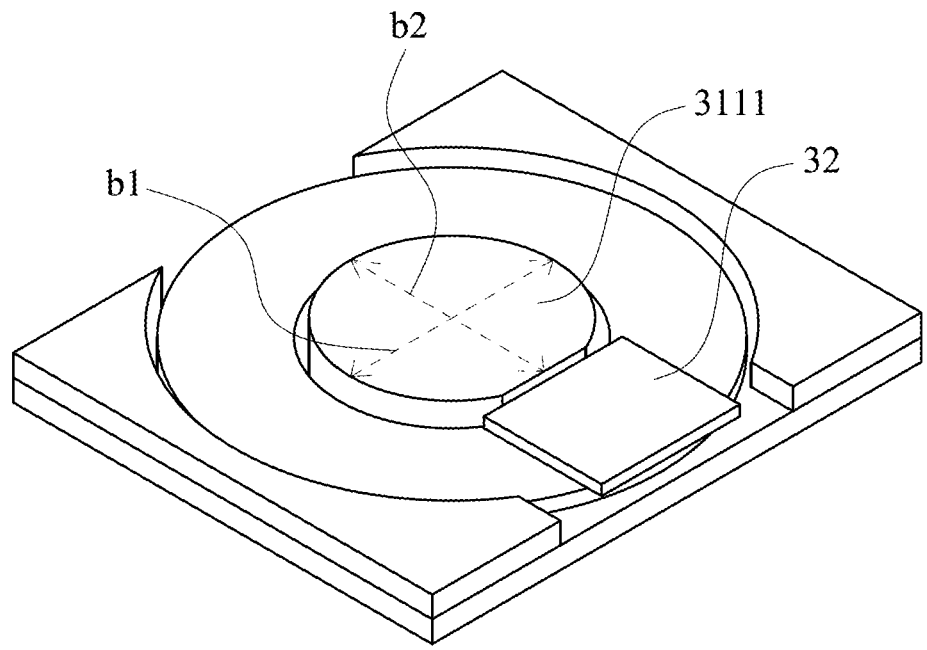
FIG. 18 is a schematic structure diagram showing an electronic device according to an $18^{th}$ embodiment of the present disclosure.

Referring to FIG. 18, FIG. 18 is a schematic structure diagram showing an electronic device according to an 18th embodiment of the present disclosure. Similar to the 17th embodiment, when a height and a width of second circuit module 32 both are greater than a space in which the magnetic core set 311 can be disposed, an accommodation portion is disposed in the magnetic core set 311 for receiving at least one portion of the second circuit module 32. As shown in FIG. 18, a portion of the magnetic core column 3111 of the magnetic core set 311 is cut off to receive the second circuit module 32, i.e., the accommodation portion is disposed at a side of the magnetic core column 3111 close to the second circuit module 32.

In other words, as shown in FIG. 18, the magnetic core column 3111 has a first diameter b1 and a second diameter b2, wherein the second diameter b2 is less than the first diameter b1. The accommodation portion is disposed at a side along the direction of the second diameter b2 of the magnetic core column 311, so as to accommodate the second circuit module 32.

19th Embodiment

Figure 19:
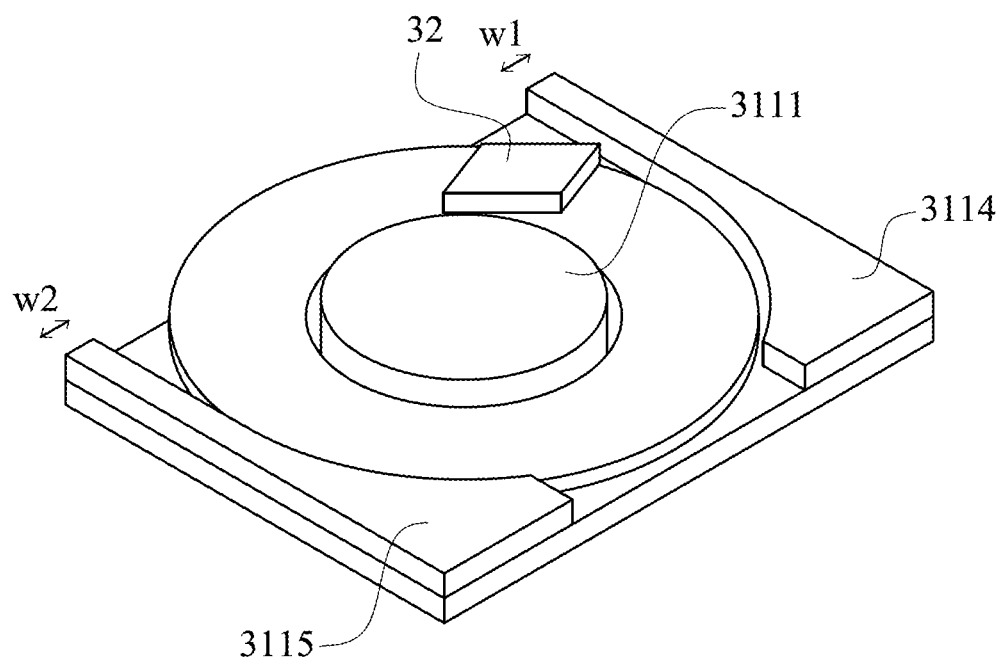
FIG. 19 is a schematic structure diagram showing an electronic device according to a $19^{th}$ embodiment of the present disclosure.

Referring to FIG. 19, FIG. 19 is a schematic structure diagram showing an electronic device according to a 19th embodiment of the present disclosure. When a width of second circuit module 32 is greater than a space in which the magnetic core set 311 can be disposed, as shown in FIG. 18, a portion of the magnetic core side column 3114 or 3115 of the magnetic core set 311 may be cut off to receive at least one portion of the second circuit module 32, i.e., the accommodation portion is disposed on the magnetic core side column 3114 or the magnetic core side column 3115 close to the second circuit module 32. Through this arrangement, the vertical projection areas of the second circuit module 32 and the magnetic core set 311 on the first plane have an overlap portion. In this embodiment, an area ratio of the vertical projection area of any AC loop around the same magnetic core column on the first plane to an overlap portion of the vertical projection areas of all of the loops around the same magnetic core column on the first plane is in a range close to 1. Alternatively, the structure shown in FIG. 7 may also be used for adjusting the magnetic core side column to receive the circuit module.

As shown in FIG. 19, a width w1 of the side of the magnetic core side column 3114 is shorter than a width w2 of the side of the magnetic core side column 3115. Thus, the accommodation portion can be disposed at a side of the magnetic core side column 3114 close to the first second circuit module 32 (or the first circuit module 33).

20th Embodiment

Figure 20A:
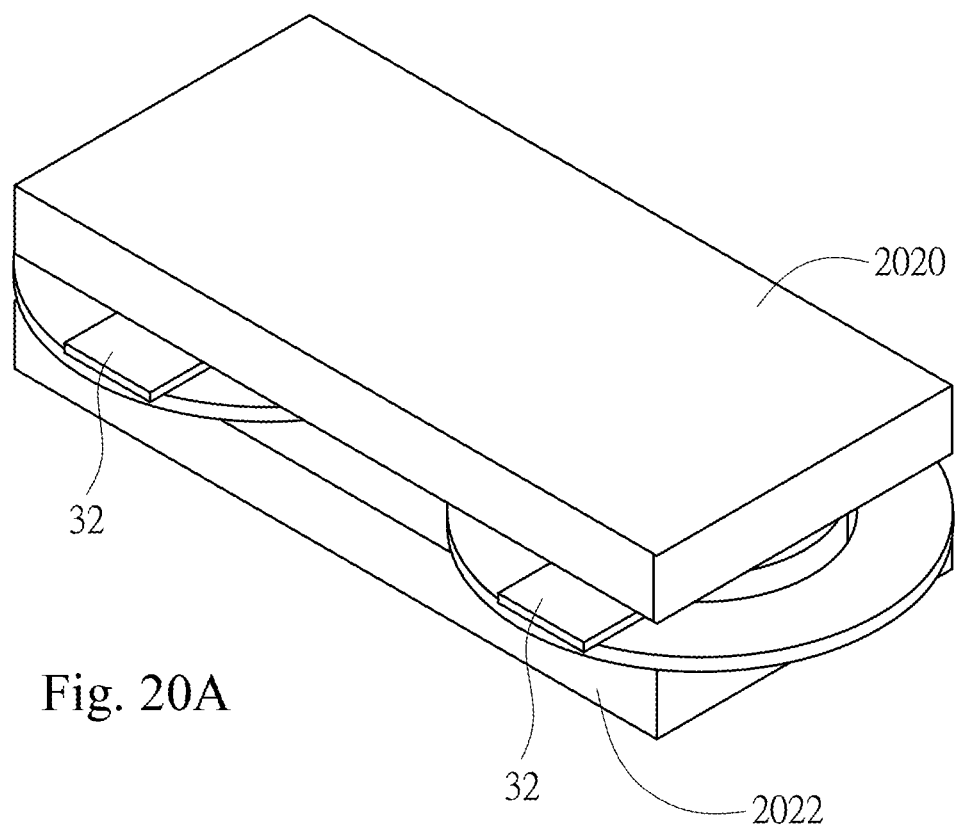
FIG. 20A is a schematic structure diagram showing an electronic device according to a $20^{th}$ embodiment of the present disclosure.
Figure 20B:
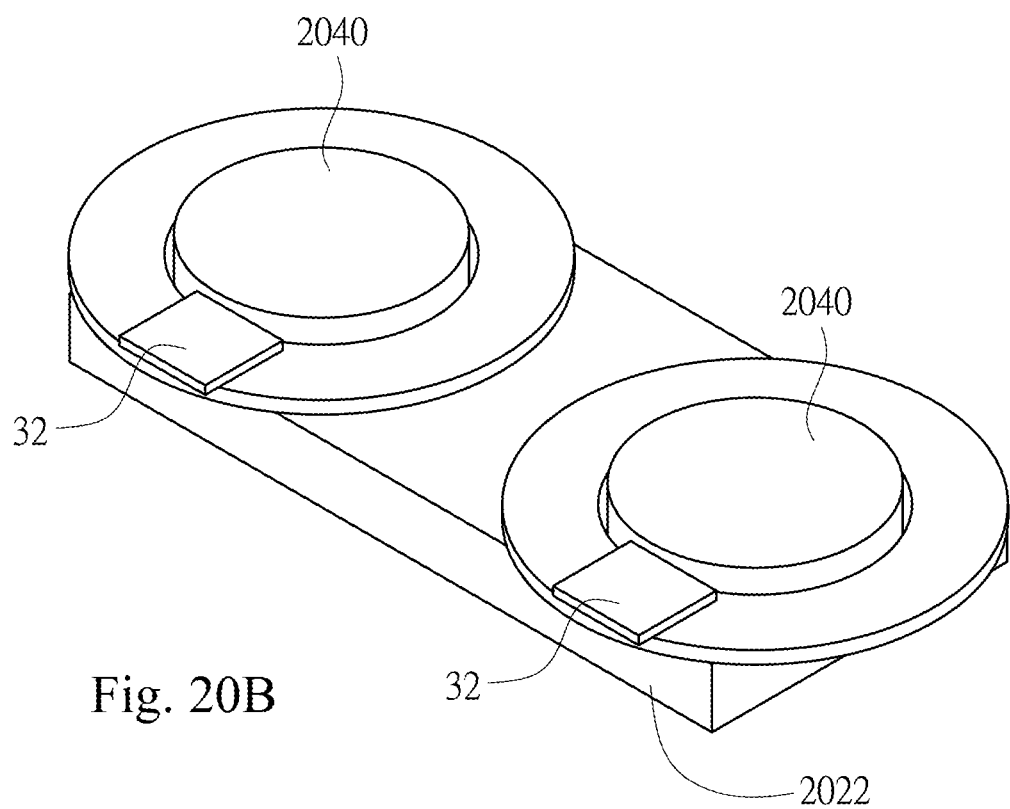
FIG. 20B is a schematic structure diagram showing a magnetic core set shown in FIG. 20A.

Referring to FIG. 20A and FIG. 20B, FIG. 20A is a schematic structure diagram showing an electronic device according to a 20th embodiment of the present disclosure; and FIG. 20B is a schematic diagram of structure showing a magnetic core set shown in FIG. 20A. The aforementioned embodiments use the EQ-type magnetic core as an example, and a U-type magnetic core is exemplified in this embodiment. The magnetic core set 311 in this embodiment includes a first core cover plate 2020, a second core cover plate 2022 and a plurality of magnetic core columns 2040, and two magnetic core columns are exemplified in this embodiment. A plurality of the magnetic core columns 2040 connect to the first core cover plate 2020 and the second core cover plate 2022 to form a magnetic close loop. As shown in FIG. 20A, the vertical projection area of the first core cover plate 2020 on the first plane has an overlap portion with the vertical projection area of at least one portion of the second circuit module 32 on the first plane, or the vertical projection area of the second core cover plate 2022 on the first plane has an overlap portion with the vertical projection area of at least one portion of the second circuit module 32 on the first plane. In other words, in this embodiment, the vertical projection areas of the second circuit module 32 (or the first circuit module 33) and the magnetic core set 311 on the first plane have an overlap portion.

For clear explanation, referring to FIG. 20B, an area ratio of the vertical projection area of any AC loop around the same magnetic core column on the first plane to an overlap portion of the vertical projection areas of all of the loops around the same magnetic core column on the first plane is in a range from about 1 to about 1.2. In this embodiment, the second core cover plate 2022 may cover the second circuit module 32, i.e., the projection area of the second circuit and the projection area of the magnetic core have an overlap portion.

Figure 20C:
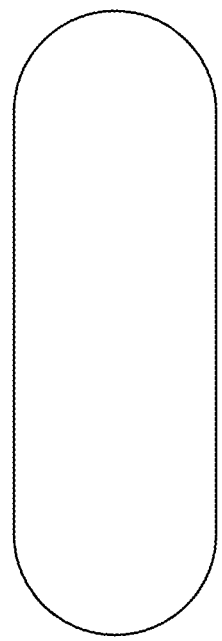
FIG. 20C-20F are schematic diagrams illustrating the shapes of cross section of the magnetic core columns shown in FIG. 20A.
Figure 20D:
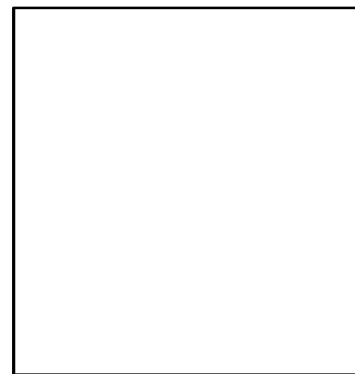
Figure 20E:
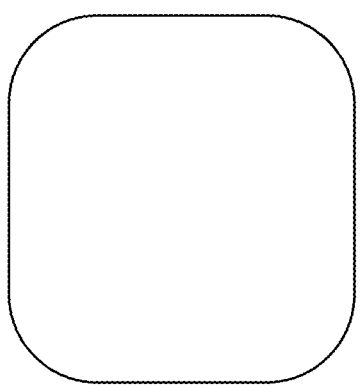
Figure 20F:
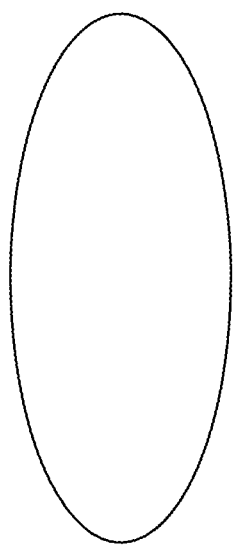

Further, as shown in FIG. 20B, a shape of the cross section of the magnetic core columns 2040 is a round. However, the present disclosure is not limited thereto. Referring to FIG. 20C-20F, FIG. 20C-20F are schematic diagrams illustrating the shapes of cross section of the magnetic core columns 2040 shown in FIG. 20A. In various embodiments, the shape of the cross section of the magnetic core columns 2040 can be a racetrack (as shown in FIG. 20C), a rectangle (as shown in FIG. 20D), a rounded rectangle (as shown in FIG. 20E), or an oval (as shown in FIG. 20F). Those aforementioned shapes are for illustrative purposes. One of person having ordinary skill in the art can adjust the shape of the cross-section of the magnetic core column of the U-type magnetic core.

21st Embodiment

Figure 21:
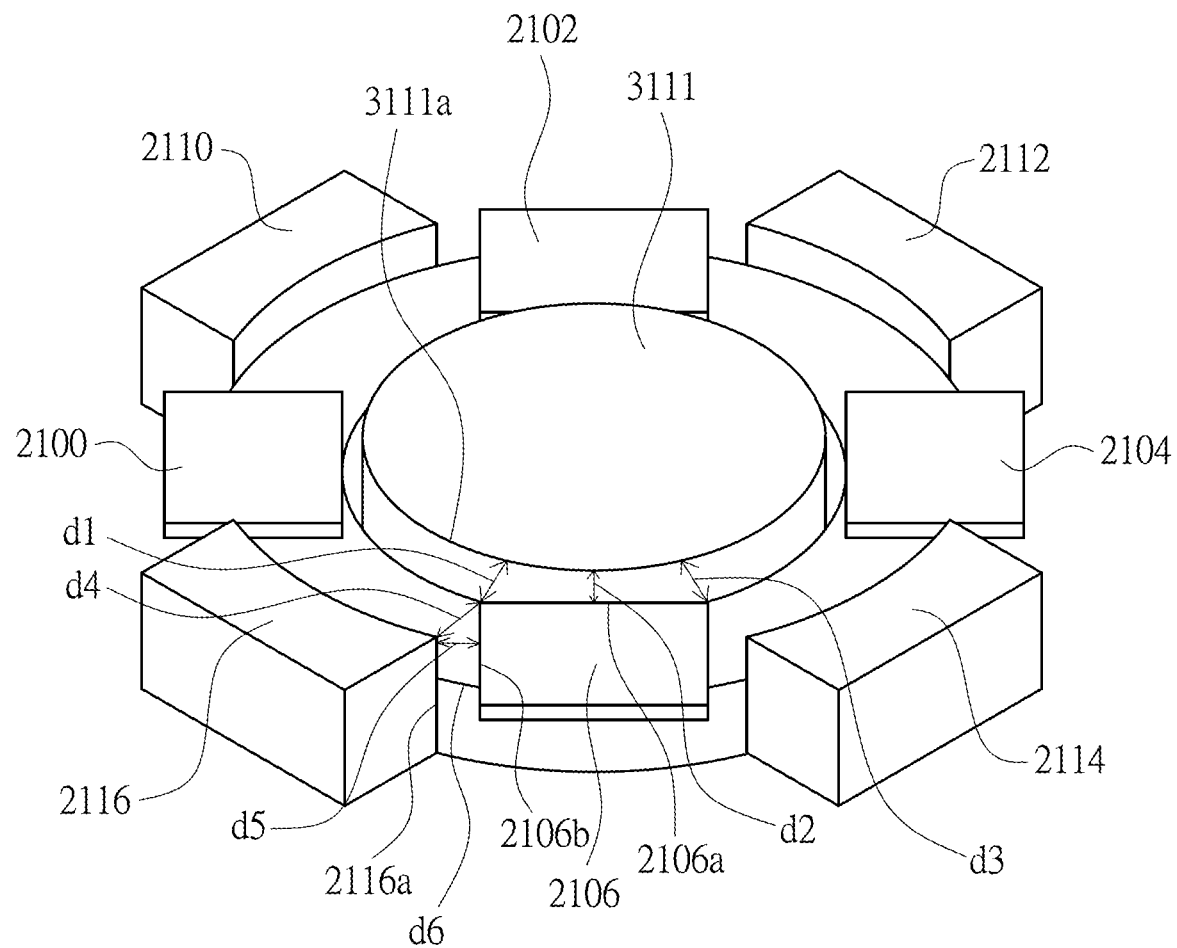
FIG. 21 is a schematic structure diagram of showing an electronic device according to a $21^{st}$ embodiment of the present disclosure.

Referring to FIG. 21, FIG. 21 is a schematic structural diagram showing an electronic device according to a 21st embodiment of the present disclosure. As shown in FIG. 21, when a number of circuit modules need to be connected to a magnetic component, the quantity of side columns of the magnetic core set 311 may be adjusted for disposing the circuit modules. For example, if the magnetic component needs to be connected to the circuit modules 2100, 2102, 2104 and 2106, a number of side columns 2110, 2112, 2114 and 2116 can be disposed around the magnetic core column 3111, and the side columns can be connected to the first core cover plate of magnetic core set and a second core cover plate of magnetic core set to form side openings for accommodating circuit modules on the PCB board. Furthermore, if the heat radiation and arrangement of the circuit module are taken into consideration, the arrangement of the magnetic side column can also be adjusted correspondingly.

It is noted that, in 14th embodiment to 21st embodiment, the full wave rectifier circuit 1400 in FIG. 14A is illustrated as an example, and the magnetic component using the structures of the embodiments 14th embodiment to 21st embodiment can achieve that: an area ratio of a vertical projection area of any AC loop around the same magnetic core column on the first plane to an overlap portion of the vertical projection areas of all of the loops around the same magnetic core column on the first plane is in a range from about 1 to about 1.2. The aforementioned embodiments are also suitable for different circuits, and the first circuit module 33 coupled to the first winding (such as primary winding) 312b is also suitable for the various connecting structures described above. Furthermore, an EQ-type magnetic core and a U-type magnetic core are exemplified in the aforementioned embodiments, but the present disclosure is also suitable for an EE-type magnetic core, an EI-type magnetic core, an EFD-type magnetic core, a RM-type magnetic core, a pot magnetic core, or a PJ-type magnetic core, and the circuit module is not be limited to the aforementioned switch modules or capacitor modules. Those skilled in the art may adjust various magnetic core structures and the corresponding circuit module structures.

Moreover, in various embodiments of the present disclosure, distances are presented between the any edges of the first circuit module 33 or the second circuit module 32 and any edges of the magnetic core column 3111, the magnetic core side column 3114, or the magnetic core side column 3115. With the configurations illustrated in the present disclosure, the shortest distance can be less than 2 millimeters (mm).

Taking the circuit module 2106 shown in FIG. 21 as example, the distance d1, d2, d3 are presented between the edge 2106a of the circuit module and the edge 3111a of the magnetic core column 3111, wherein the distance d2 is the shortest one of the distances d1-d3. In this embodiment, the distance d2 can be less than about 2 mm.

Alternatively, in another embodiment, the distance d4, d5, d6 are presented between the edge 2106b of the circuit module 2106 and the edge 2116a of the magnetic core side column 2116, wherein the distance d5 is the shortest one of the distances d4-d6. In this embodiment, the distance d5 can be less than about 2 mm as well.

The descriptions above are given for illustrative purposes, and the same configurations can be applied to any edges of one of the circuit modules 2100, 2102, 2104, 2016 with the adjacent magnetic core columns or any edges of the magnetic core column 3111.

22$^{nd}$ Embodiment

Figure 22A:
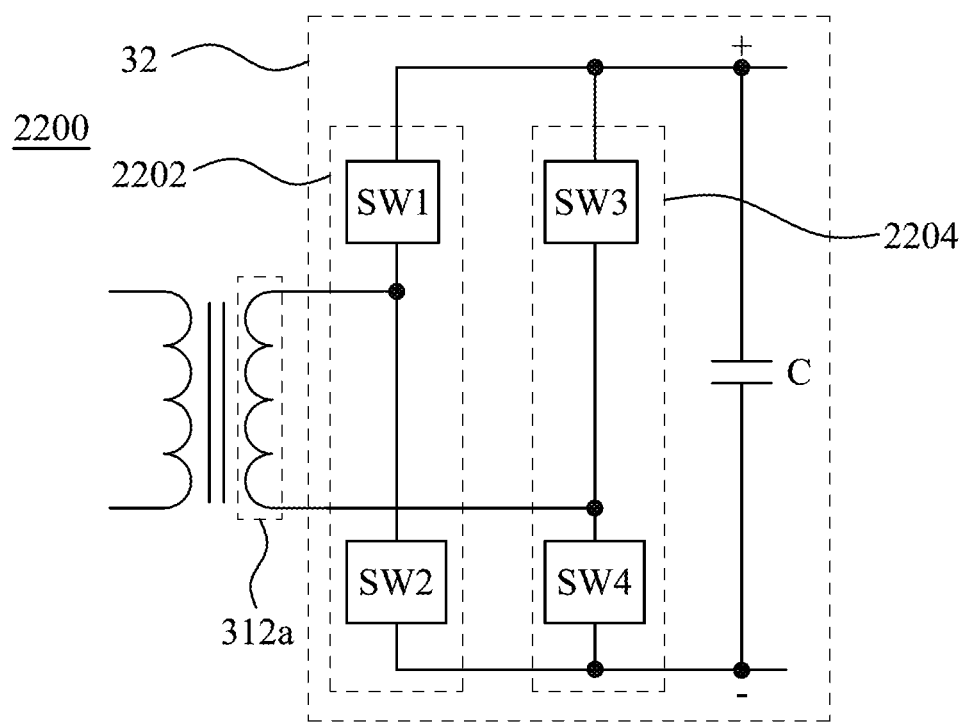
FIG. 22A is a schematic diagram of a full bridge rectifying circuit according to a $22^{nd}$ embodiment of the present disclosure.

Referring to FIG. 22A, FIG. 22A is a schematic diagram of a full bridge rectifying circuit according to a 22$^{nd}$ embodiment of the present disclosure. Compared with the half bridge circuit shown in FIG. 14A, the first circuit module 33 or the second circuit module 32 can be a full bridge circuit in various embodiments of the present disclosure.

As shown in FIG. 22A, taking the second circuit module 32 as example, the full bridge circuit 2200 includes a first bridge arm 2002, a second bridge arm 2204, and a capacitor module C. The first bridge arm 2202 includes a first switch module SW1 and a second switch module SW2. The second bridge arm 2204 includes a third switch module SW3 and a fourth switch module SW4.

As shown in FIG. 22A, a first terminal of the first switch module SW1 is electrically coupled to a first terminal of the third switch module SW3 and a first terminal of the capacitor module C, and a second terminal of the first switch module SW1 and a first terminal of the second switch module SW2 are electrically coupled to the first terminal of the second winding 321a. A second terminal of the third switch module SW3 is electrically coupled to the second terminal of the second winding 321a and a first terminal of the fourth switch module SW4, and a second terminal of the fourth switch module SW4 is electrically coupled to the second terminal of the second switch module SW2 and a second terminal of the capacitor module C.

The following paragraphs provide certain embodiments related to implement the full bridge circuit 2200 shown in FIG. 22A with the configurations of the electronic device 3. However, the present disclosure is not limited to the following embodiments.

23$^{rd}$ Embodiment

Figure 22B:
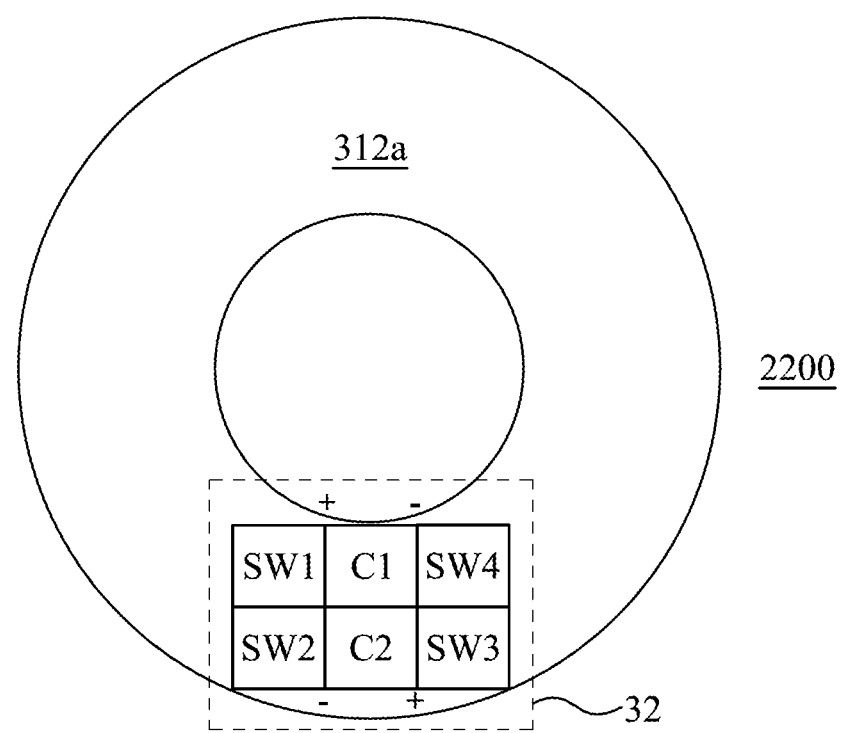
FIG. 22B is a schematic diagram illustrating a planar architecture of the full bridge circuit shown in FIG. 22A according to $22^{nd}$ embodiment of the present disclosure.

Referring to both of FIG. 22A and FIG. 22B, FIG. 22B is a schematic diagram illustrating a planar architecture of the full bridge circuit shown in FIG. 22A according to 22$^{nd}$ embodiment of the present disclosure. In this embodiment, the capacitor module C at least includes a capacitor C1 and a capacitor C2. The first switch module SW1, the fourth switch module SW4, and the capacitor C1 are disposed on a first side (an inner side of the second winding 312a) of the second winding close to the magnetic core, and the second switch module SW2, the third switch module SW3, and the capacitor C2 are disposed on a second side (an outer side of the second winding 312a), corresponding to the first side, of the second winding 312a. As shown in FIG. 22B, in some embodiments, a positive terminal of the capacitor module C (i.e., capacitors C1 and C2) can be electrically coupled to the first switch module SW1 and the third switch module SW3 through additional wires, and an negative terminal of the capacitor module C (i.e., capacitors C1 and C2) can be electrically coupled to the second switch module SW2 and the fourth switch module SW4 through additional wires.

In addition, in some embodiments, the components of full bridge circuit 2200 can be disposed on a same surface (as shown in FIG. 22B) or different surfaces of the second winding 312a. For illustration, the first switch module SW1 and the second switch module SW2 can be disposed on the upper surface of the second winding 312a, and the third switch module SW3 and the fourth switch module SW4 can be disposed on the lower surface of the second winding 312a. Under the circumstances, the capacitor C1 and the capacitor C2 can be disposed on any surfaces of the second winding 312a. In some other embodiments, when the second winding 312a is windings coupled in parallel or a single winding, the capacitor module C can be configured to be disposed on any surfaces of the second winding 312a, or to pass through the second winding 312a.

24$^{th}$ Embodiment

Figure 22C:
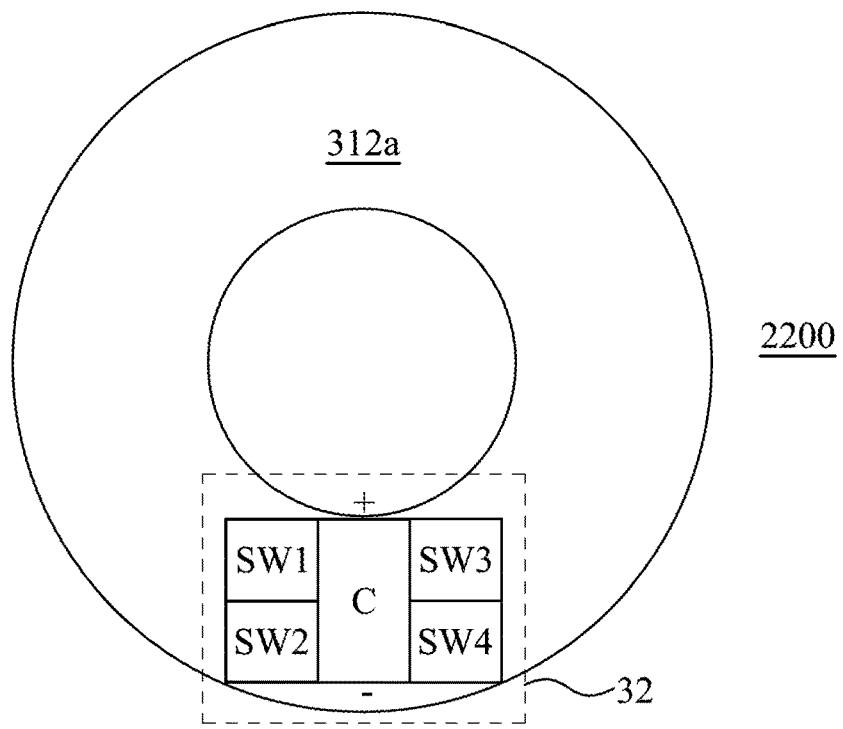
FIG. 22C is another schematic diagram illustrating a planar architecture of the full bridge circuit shown in FIG. 22A according to $22^{nd}$ embodiment of the present disclosure.

Referring to both of FIG. 22A and FIG. 22C, FIG. 22C is another schematic diagram illustrating a planar architecture of the full bridge circuit shown in FIG. 22A according to 22$^{nd}$ embodiment of the present disclosure. Compared with the 23rd embodiment, as shown in FIG. 22C, the capacitor C includes at least one capacitor C1, and the position of the third switch module SW3 is exchanged with the position of the fourth switch module SW4. In other words, in this embodiment, the first switch module SW1 and the third switch module SW3 are disposed at the inner side of the second winding 312a, and the second switch module SW2 and the fourth switch module SW4 are disposed at the outer side of the second winding 312a.

Similarly, in this embodiment, the components of the full bridge circuit 2200 can also disposed on the same surface (as shown in FIG. 22C) or different surfaces of the second winding 312a. For illustration, the first switch module SW1 and the second switch module SW2 can be disposed on the upper surface of the second winding 312a, and the third switch module SW3 and the fourth switch module SW4 can be disposed on the lower surface of the second winding 312a. Under this circumstance, the capacitor C1 can be disposed on any surfaces of the second winding 312a. In some other embodiments, when the second winding 312a is windings coupled in parallel or a single winding, the capacitor module C (i.e., the capacitor C1) can be configured to be disposed on any surfaces of the second winding 312a, or to pass through the second winding 312a.

25$^{th}$ Embodiment

Figure 22D:
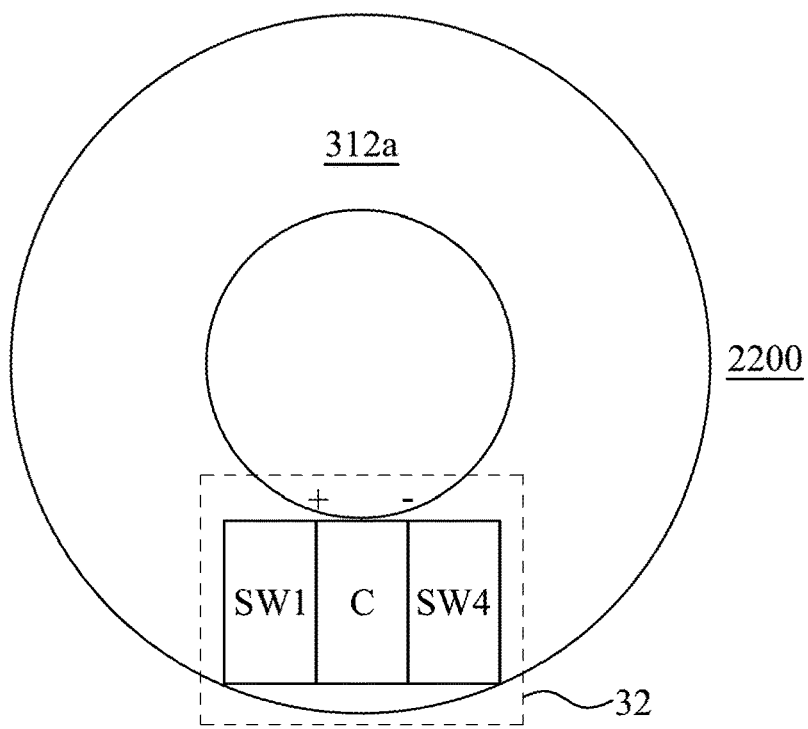
FIG. 22D is a schematic diagram illustrating an arrangement of the full bridge circuit being disposed on a first surface of the second winding according to $25^{th}$ embodiment of the present disclosure.
Figure 22E:
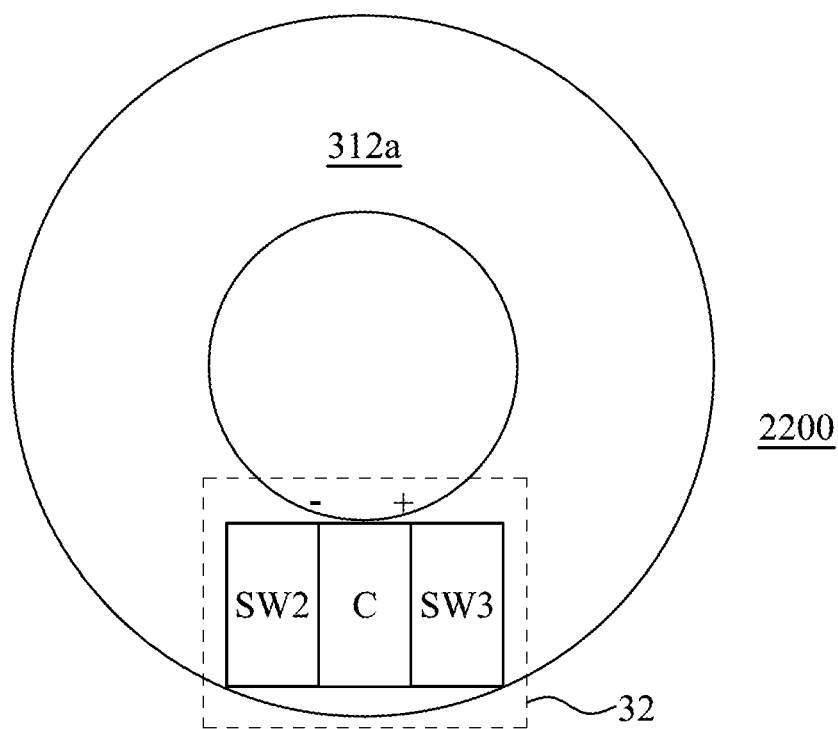
FIG. 22E is a schematic diagram illustrating an arrangement of the full bridge circuit being disposed on a second surface of the second winding according to $25^{th}$ embodiment of the present disclosure.

Referring to both of FIG. 22A, FIG. 22D, and FIG. 22E, FIG. 22D is a schematic diagram illustrating an arrangement of the full bridge circuit being disposed on a first surface of the second winding according to 25$^{th}$ embodiment of the present disclosure, and FIG. 22E is a schematic diagram illustrating an arrangement of the full bridge circuit being disposed on a second surface of the second winding according to 25$^{th}$ embodiment of the present disclosure. As shown in FIG. 22D, the first switch module SW1 and the fourth switch module SW4 are disposed on a first surface (e.g., a front surface) of the second winding 312a. Similarly, the second switch module SW2 and the third switch module SW3 are disposed on a second surface (e.g., a back surface) of the second winding 312a. In this embodiment, the capacitor C can include one or more capacitors, and can be disposed on any planes of the second winding 312a. When the capacitor module C is disposed on the first surface, the capacitor module C can be coupled to the second switch module SW2 and the third switch module SW3 through the vias. Alternatively, when the capacitor module C is disposed on the second surface, the capacitor module C can be coupled to the first switch module SW1 and the fourth switch module SW4 through the vias.

Figure 22F:
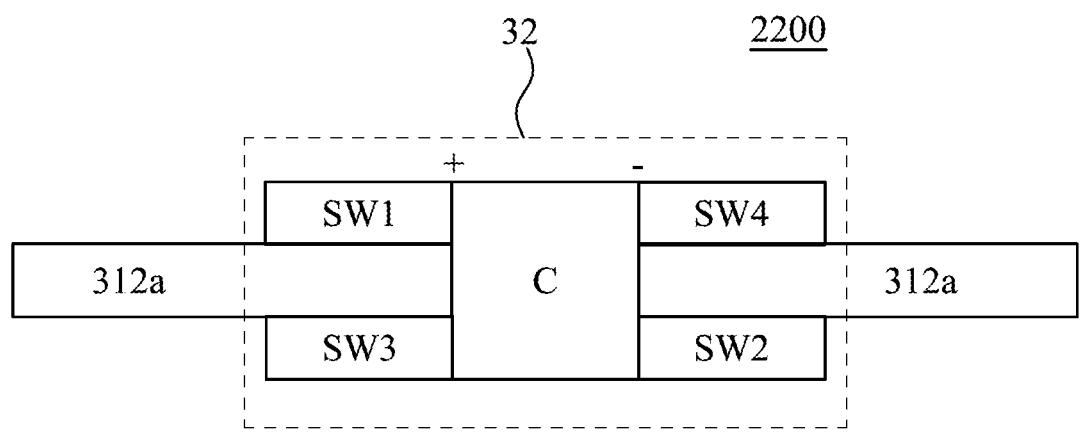
FIG. 22F is a schematic diagram illustrating a cross-section view of the full bridge circuit according to $22^{nd}$ embodiment of the present disclosure.

Referring to FIG. 22F, FIG. 22F is a schematic diagram illustrating a cross-section view of the full bridge circuit according to 22$^{nd}$ embodiment of the present disclosure. Compared with FIG. 22D or FIG. 22E, in this embodiment, the capacitor module C is further configured to pass through the second winding 312a.

Further, in one embodiment, as shown in FIG. 22B-22E, an area ratio of the vertical projection area of the AC loop formed by the second winding 312a and the second circuit module 32 on the first plane to an overlap portion of vertical projection areas of all of the loops around the same magnetic core column of the magnetic core set on the first plane is in a range substantially from 1 to 1.2. In other words, by using any configurations above, the vertical projection areas of the full bridge circuit 2200 and the magnetic core set have an overlap portion. Thus, the size of the electronic device can be reduced.

The descriptions about the second circuit module 32 and the second winding 312a above are given for only illustrative purpose, and the present disclosure is not limited thereof. In different embodiments, the arrangements and the circuit architectures of full bridge circuit 2200 can be applied to the first circuit module 33 and the first winding 312b. For illustration, when the full bridge circuit 2200 is applied to the first circuit module 33, the first circuit module 33 can be an inverter module. When the full bridge circuit 2200 is applied to the second circuit module 32, the second circuit module 32 can be a rectifier module. One of person having ordinary skills in the art can adjust the arrangements of the full bridge circuit 2200 according to practical applications.

It can be known from the above that, the electronic devices of the present disclosure changes the position of the first circuit module, the position of the second circuit module, the outlet connector structures of the magnetic element and the structure of the magnetic core set to reduce the energy stored by the magnetic field formed from the secondary-side outlet connector loop and the primary-side outlet connector loop, thus reducing the leakage inductance formed from the secondary-side outlet connector loop and the primary-side outlet connector loop. Moreover, the aforementioned magnetic core set can be cutoff at an arbitrary position, and the magnetic component is connected to the circuit modules having connection relationships therewith, so that the vertical projection area of the first circuit module or the second circuit module on the first plane can have an overlap portion with the vertical projection area of magnetic core set or the windings on the first plane, and the size of the element and the leakage inductances between the windings can be reduce.

Although the present disclosure has been described as above, but should not be limited to the present disclosure, It will be apparent to those skilled in the art that various modifications and variations can be made to the structure of the present disclosure without departing from the scope or spirit of the disclosure, therefore, the scope of the present disclosure should be protected in conformity with the scope of the following claims.

What is claimed is:

1. An electronic device, comprising:
a magnetic element comprising a magnetic core set and a winding assembled in the magnetic core set;
a first circuit module being a rectifier circuit module and coupled to the winding of the magnetic element;
wherein a vertical projection area of the first circuit module has an overlap portion with a vertical projection area of the winding of the magnetic element on a first plane, and the first plane is a horizontal plane at which the winding is located,
wherein the winding is a secondary winding, the secondary winding comprises a first secondary winding component and a second secondary winding component, and the rectifier circuit module comprises:
a first switch module being coupled to the first secondary winding component, and the first switch module being disposed on an upper surface of the first secondary winding component; and
a second switch module being coupled to the second secondary winding component, and the second switch module being disposed on a lower surface of the second secondary winding component.

2. The electronic device of claim 1, wherein the rectifier circuit module comprises:
a first capacitor module, the first capacitor being coupled to the first secondary winding component, and the first capacitor module being disposed on the upper surface of the first secondary winding component; and
a second capacitor module, the second capacitor being coupled to the second secondary winding component, and the second capacitor module being disposed on the lower surface of the second secondary winding component.

3. The electronic device of claim 1, wherein the rectifier circuit module comprises:
a capacitor module coupled to the first switch module and the capacitor module being disposed on the upper surface of the first secondary winding component; and
the second switch module coupled to the capacitor module through vias.

4. An electronic device, comprising:
a magnetic element comprising a magnetic core set and a first winding and a second winding, and the first winding and the second winding are assembled in the magnetic core set;
a first circuit module coupled to the first winding of the magnetic element;
a second circuit module coupled to the second winding of the magnetic element;
wherein a vertical projection area of the first circuit module has an overlap portion with a vertical projection area of the first winding of the magnetic element on a first plane, and the first plane is a horizontal plane at which the first winding is located, and
wherein the first circuit module comprises:
a first bridge arm, comprising a first switch module and a second switch module, wherein the first switch module comprises a first terminal and a second terminal, the second switch module comprises a first terminal and a second terminal, the second terminal of the first switch module and the first terminal of the second switch module are coupled to a first terminal of the first winding;
a second bridge arm, comprising a third switch module and a fourth switch module, wherein the third switch module comprises a first terminal and a second terminal, the fourth switch module comprises a first terminal and a second terminal, the first terminal of the third switch module is coupled to the first terminal of the first switch module, the second terminal of the third switch module is coupled to a second terminal of the first winding, the first terminal of the fourth switch module is coupled to the second terminal of the third switch module, and the second terminal of the fourth switch module is coupled to the second terminal of the second switch module; and
a capacitor module coupled between the first terminal of the third switch module and the second terminal of the fourth switch module,
wherein the first switch module and the fourth switch module are disposed at a first surface of the first winding, and the second switch module and the third switch module are disposed at the first surface or a second surface of the first winding.

5. The electronic device of claim 4, wherein the capacitor module comprises a first capacitor and a second capacitor, wherein the first switch module, the fourth switch module, and the first capacitor are disposed at a first side of the first winding close to a magnetic core column, and the second switch module, the third switch module, and the second capacitor are disposed at a second side of the first winding.

6. The electronic device of claim 4, wherein the capacitor module comprises at least one capacitor, when the capacitor is disposed on the first surface, the capacitor is coupled to the second switch module and the third switch module through vias, and when the capacitor is disposed on the second surface, the capacitor is coupled to the first switch module and the fourth switch module through the vias.

7. An electronic device, comprising:
a magnetic element comprising a magnetic core set and a winding assembled in the magnetic core set;
a first circuit module being a rectifier circuit module and coupled to the winding of the magnetic element;
wherein a vertical projection area of the first circuit module has an overlap portion with a vertical projection area of the magnetic core set on a first plane, and the first plane is a horizontal plane at which the winding is located,
wherein the first circuit module comprises:
a first bridge arm, comprising a first switch module and a second switch module, wherein the first switch module comprises a first terminal and a second terminal, the second switch module comprises a first terminal and a second terminal, the second terminal of the first switch module and the first terminal of the second switch module are coupled to a first terminal of the first winding;
a second bridge arm, comprising a third switch module and a fourth switch module, wherein the third switch module comprises a first terminal and a second terminal, the fourth switch module comprises a first terminal and a second terminal, the first terminal of the third switch module is coupled to the first terminal of the first switch module, the second terminal of the third switch module is coupled to a second terminal of the first winding, the first terminal of the fourth switch module is coupled to the second terminal of the third switch module, and the second terminal of the fourth switch module is coupled to the second terminal of the second switch module; and
a capacitor module coupled between the first terminal of the third switch module and the second terminal of the fourth switch module,
wherein the capacitor module comprises a first capacitor and a second capacitor, wherein the first switch module, the fourth switch module, and the first capacitor are disposed at a first side of the first winding close to a magnetic core column, and the second switch module, the third switch module, and the second capacitor are disposed at a second side of the first winding.

8. The electronic device of claim 7, wherein the first switch module and the second switch module are disposed on a first surface of the first winding, and the third switch module and the fourth module are disposed on the first surface or a second surface of the first winding.

9. An electronic device, comprising:
a magnetic element comprising a magnetic core set and a winding assembled in the magnetic core set;
a first circuit module being a rectifier circuit module and coupled to the winding of the magnetic element;
wherein a vertical projection area of the first circuit module has an overlap portion with a vertical projection area of the magnetic core set on a first plane, and the first plane is a horizontal plane at which the winding is located,
wherein the first circuit module comprises:
a first bridge arm, comprising a first switch module and a second switch module, wherein the first switch module comprises a first terminal and a second terminal, the second switch module comprises a first terminal and a second terminal, the second terminal of the first switch module and the first terminal of the second switch module are coupled to a first terminal of the first winding;
a second bridge arm, comprising a third switch module and a fourth switch module, wherein the third switch module comprises a first terminal and a second terminal, the fourth switch module comprises a first terminal and a second terminal, the first terminal of the third switch module is coupled to the first terminal of the first switch module, the second terminal of the third switch module is coupled to a second terminal of the first winding, the first terminal of the fourth switch module is coupled to the second terminal of the third switch module, and the second terminal of the fourth switch module is coupled to the second terminal of the second switch module; and a capacitor module coupled between the first terminal of the third switch module and the second terminal of the fourth switch module, wherein the first switch module and the fourth switch module are disposed on a first surface of the first winding, and the second switch module and the third switch module are disposed on a second surface of the first winding.

10. The electronic device of claim 9, wherein the capacitor module comprises at least one capacitor, when the capacitor is disposed on the first surface, the capacitor is coupled to the second switch module and the third switch module through vias, and when the capacitor is disposed on the second surface, the capacitor is coupled to the first switch module and the fourth switch module through the vias.

* * * * *